United States Patent
Okamoto

[11] Patent Number: 6,003,765
[45] Date of Patent: *Dec. 21, 1999

[54] ELECTRONIC CASH IMPLEMENTING METHOD WITH A SURVEILLANCE INSTITUTION, AND USER APPARATUS AND SURVEILLANCE INSTITUTION APPARATUS FOR IMPLEMENTING THE SAME

[75] Inventor: Tatsuaki Okamoto, Yokosuka, Japan

[73] Assignee: Nippon Telegraph and Telephone Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/855,580

[22] Filed: May 13, 1997

[30] Foreign Application Priority Data

May 16, 1996 [JP] Japan ................................ 8-121688

[51] Int. Cl.⁶ .................................................. G06F 17/60
[52] U.S. Cl. ........................... 235/379; 235/385; 705/34; 380/24; 902/39
[58] Field of Search ................................ 235/379, 380, 235/389; 902/39, 40; 705/16, 17, 18, 34, 44; 380/9, 24, 25, 29, 30

[56] References Cited

U.S. PATENT DOCUMENTS

| | | | |
|---|---|---|---|
| 4,625,076 | 11/1986 | Okamoto et al. | 380/23 |
| 4,969,189 | 11/1990 | Ohta et al. | 380/25 |
| 4,977,595 | 12/1990 | Ohta et al. | 380/24 |
| 4,984,270 | 1/1991 | LaBounty | 380/24 |
| 5,224,162 | 6/1993 | Okamoto et al. | 380/24 |
| 5,396,558 | 3/1995 | Ishiguro et al. | 380/25 |
| 5,446,796 | 8/1995 | Ishiguro et al. | 380/24 |
| 5,455,407 | 10/1995 | Rosen | 235/380 |
| 5,502,765 | 3/1996 | Ishiguro et al. | 380/24 |
| 5,511,121 | 4/1996 | Yacobi | 380/24 |
| 5,559,887 | 9/1996 | Davis et al. | 380/24 |
| 5,604,802 | 2/1997 | Holloway | 380/24 |
| 5,621,796 | 4/1997 | Davis et al. | 380/24 |
| 5,668,878 | 9/1997 | Brands | 380/30 |
| 5,701,343 | 12/1997 | Takashima et al. | 380/4 |
| 5,754,656 | 5/1998 | Nishioka et al. | 380/25 |
| 5,770,844 | 6/1998 | Henn | 235/380 |
| 5,781,632 | 7/1998 | Odom | 380/24 |
| 5,799,087 | 8/1998 | Rosen | 380/24 |
| 5,832,460 | 11/1998 | Bednar et al. | 705/27 |
| 5,848,400 | 12/1998 | Chang | 705/35 |
| 5,901,229 | 5/1999 | Fujisaki et al. | 380/30 |
| 5,926,548 | 7/1999 | Okamoto | 380/24 |

*Primary Examiner*—Donald Hajec
*Assistant Examiner*—Jared J. Fureman
*Attorney, Agent, or Firm*—Pollock, Vande Sande & Amernick

[57] ABSTRACT

A method for implementing an electronic cash system with a surveillance institution, in which a user sends a request for the issuance of electronic cash of a face value X to a bank together with user information U and a user signature verification key $N_U$, and the bank stores a pair of data X and $N_U$ in the user database in correspondence with the user information U and sends the pair of data to the surveillance institution, while at the same time the bank generates and sends a signature $S_B(X,N_U)$ for the data $(X,N_U)$ to the user. The surveillance institution registers the data $(X,N_U)$ in a surveillance database in correspondence with the total amount of payments Y. The user sends to a shop the amount of payment y, the face value X, the signature verification key $N_U$ and the signature $S_B(X,N_U)$, along with a signature $S_U(e,y)$ for challenge information e received from the shop. The shop verifies the signatures $S_B(X,N_U)$ and $S_U(e,y)$ and, if they are valid, receives a payment with the electronic cash.

21 Claims, 11 Drawing Sheets

ELECTRONIC CASH IMPLEMENTING METHOD WITH A SURVEILLANCE INSTITUTION, AND USER APPARATUS AND SURVEILLANCE INSTITUTION APPARATUS FOR IMPLEMENTING THE SAME

BACKGROUND OF THE INVENTION

The present invention relates to an electronic cash implementing method that permits divisional use of electronic cash through a telecommunication system or smart card, ensures user privacy and prevents abuses of electronic cash. The invention also pertains to a user apparatus and a surveillance institution apparatus for implementing the method.

In recent years there has been popularized an electronic funds transfer employing a telecommunication system. In general, a certificate convertible into money, such as a draft or check, has a symbolic function of its own (which guarantees its possessor to the rights stated thereon). When handled in the telecommunication system, the certificate is digitized data, which could easily be copied for repeated arbitrary or unfair conversion into money. This problem arises as well in the implementation of electronic cash such as a prepaid card, because it could also be copied for repeated arbitrary or unfair conversion into money or purchase of merchandise. On the other hand, the credit card is essentially free from the danger of such double usage, but instead it has a disadvantage that the whole history of a customer's use of the card becomes known to a credit card issuing company (that is, user privacy is not preserved). As a solution to these problems, there has been proposed a scheme that uses a card having a computational function and devises a way of data exchange between a card reader and the card for its conversion into money to thereby ensure user privacy and detects its double usage. This is disclosed in, for example, Chaum, Fiat and Naor, "Untraceable electronic Cash," Proc. Of CRYPTO '88.

With the Chaum et al. scheme, however, it is necessary, for preserving security to some extent (the probability of success in overspending is $½^{30}$ or below, for instance), that three procedures of inquiry, response and verification in the processing of user's payment of electronic cash to a shop be repeated by the number of times (30 times, for example) corresponding to the security intended to be provided, this significantly increases the volume of communication required. Another problem is indivisibility of electronic cash. The principle for divisional use of electronic cash proposed so far is based on mathematical logic that utilizes a hierarchial structure as disclosed in U.S. Pat. No. 5,242,162, for instance. However, the actual implementation of this conventional scheme involves many procedures and large computational loads. The electronic cash implementing system is configured primarily on the assumption that the same financial institution both issues electronic cash and manages users' accounts, and consequently, the electronic cash issued by the financial institution returns thereto from the user via shops and banks. Hence, it is impossible to keep under surveillance the amount of electronic cash issued by each financial institution.

SUMMARY OF THE INVENTION

It is therefore an object of the present invention to provide an electronic cash implementing method which ensures user privacy and prevents abuses of electronic cash but permits reduction of the amount of communication involved in payment processing and divisional use of electronic cash and makes it possible to keep under surveillance the amount of electronic cash issued by each financial institution.

Another object of the present invention is to provide a user apparatus and surveillance institution apparatus for implementing the above-mentioned electronic cash scheme.

The electronic cash implementing method according to the present invention comprises:

step (1) wherein a user sends user information U and an amount of money X corresponding to the face value of electronic cash to a bank and requests it to withdraw the amount X from the user's account;

step (2) wherein the bank withdraws the amount X from the user's account, then generates a bank's signature $S_B(X,N_U)$ for a user signature verifying key $N_U$ and the amount X, then sends it to the user, then records management data n including information about the amount X and the signature verification key $N_U$ in a user database in correspondence with the user information U, and sends the management data n to a surveillance institution;

step (3) wherein the surveillance institution registers the management data n in a surveillance database in correspondence with a total amount of money used Y;

step (4) wherein the user pays an amount of money y to a shop, using information including a balance (an amount of money left over) x, the face value X, the signature verification key $N_U$ and the signature $S_B(X, N_U)$ as electronic cash C of the face value X and the shop receives the electronic cash C after verifying its validity; and step (5) wherein the shop receives the electronic cash C after verifying its validity and the shop sends to the surveillance institution, for the settlement of an account, whole data H of communication between the shop and the user, including information on the electronic cash C; and step (6) wherein the surveillance institution verifies the validity of the electronic cash C included in the communication data H and instructs the bank to transfer the amount y to a shop's bank account.

The above method may be modified as follows:

In step (1) the user sends information $E_T(X,N_U)$, obtained by enciphering a pair of information including the signature verification key $N_U$ and the amount X by an encipher function $E_T$ with the use of an encipher key $PK_T$ of the surveillance institution, to the bank and further to the surveillance institution and, further, the user subjects the signature verification key $N_U$ to blind signature preprocessing to obtain information $F(N_U)$ and send it to the bank. In step (2) the bank records the information $E_T(X,N_U)$ in the database instead of recording therein the management data n in correspondence with the user information U and sends to the user a blind signature $Z(N_U)$ for the information $F(N_U)$ instead of sending thereto the signature attached directly to the information $(X,N_U)$. In step (4) the user uses, as part of electronic cash, a bank signature $S_B(N_U)$ obtained by blind signature post-processing of the information $F(N_U)$.

The user apparatus according to the present invention comprises:

key generating means for generating a user signature key $SK_U$;

memory means for storing electronic cash C containing a bank signature $S_B(X,N_U)$ attached to an amount of money X and a signature verification key $N_U$, a balance (the amount of money left over) x, the face value X and the signature verification key $N_U$, and the user signature key $SK_U$;

signature generating means for attaching a signature to an amount of payment y and arbitrary information e received from a shop by the signature key $SK_U$ to generate a signature $S_U(e,y)$; and balance updating means for subtracting the amount of payment y from the balance x to update the latter.

In the above user apparatus, encipher means may be provided for enciphering information including the amount X and the signature verification key $N_U$ through the use of an encipher key of the surveillance institution, the enciphered information being sent to the bank, and blind signature pre-processing means and blind signature post-processing means may also be provided to obtain a blind signature $Z(N_U)$ of the bank for the signature verification key $N_U$, from which a bank signature $S_B(N_U)$ is obtained.

The surveillance institution apparatus according to the present invention comprises:

a surveillance database wherein management data n corresponding to a user possessing electronic cash issued thereto is registered in correspondence with the total amount of spent money Y;

a history database for storing history data H which contains electronic cash C including the balance (the amount of money left over) x, the face value X, the signature verification key $N_U$ and the signature $S_B(X, N_U)$ of the bank and the amount of payment y all received from the shop;

means which makes a check to see if there are registered in the surveillance database the management data n corresponding to the amount X and the verification key $N_U$ in the history data H and, if not, decides that the electronic cash paid to the shop is overspent electronic cash;

add means for adding the amount of payment y in the history data to the corresponding total amount of spent money Y in the surveillance database when the management data n is registered therein;

compare means for comparing the result of addition Y+y with the face value X; and control means which: if the result of comparison by the compare means is Y+y<X, updates the corresponding total amount of spent money Y in the surveillance database with the result of addition Y+y; if Y+y=X, eliminates the corresponding management data n and the total amount of spent money Y from the surveillance database; if Y+y>X, decides that the electronic cash paid to the shop is overspent electronic cash, then deletes the management data n and the total amount of spent money Y, and reports the deleted eliminated management data n to the bank.

In the above surveillance institution apparatus decipher means may be provided so that information $(X,N_U)$ obtained by deciphering the enciphered information $E_T(X,N_U)$ from the user is registered in the surveillance database.

According to the present invention, an issuing institution (a bank) which issues electronic cash and an institution (a surveillance institution) which performs verification processing for settlement of accounts are independent of each other and the latter provides surveillance of the amount of circulation of electronic cash issued from the bank. On the other hand, divisional use of electronic cash is made possible by performing payment processing with the use of the user signature key. That is, the user signature attached to the amount of payment can be presented as evidence of overspending if the user pays more than a certain amount of money.

DESCRIPTION OF THE PREFERRED EMBODIMENTS

Figure 1:
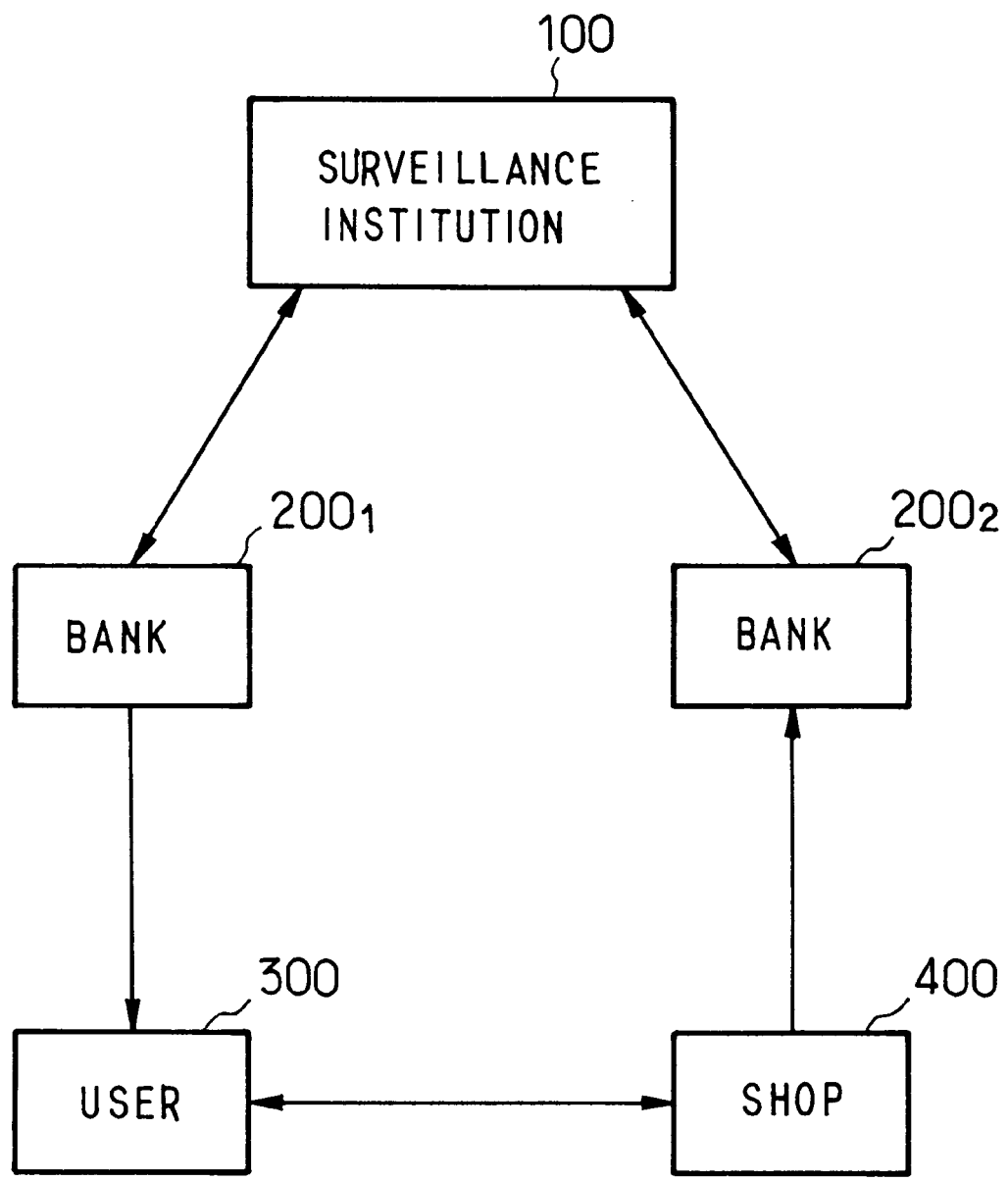
FIG. 1 is a diagram schematically illustrating the system configuration to which the present invention is applied.

In FIG. 1 there is schematically shown an example of the system configuration to which the method of the present invention is applied. In the system there are interconnected via communication lines or the like an apparatus 100 of a surveillance institution (information indicating the surveillance institution being identified by T) which monitors the issuance of electronic cash, apparatus 200 of banks (information indicating banks being identified by B) which issue electronic cash, an apparatus 300 of a user (information indicating the user being identified by U) who uses the issued electronic cash, and an apparatus 400 of a shop (information indicating the shop being identified by W) which receives electronic cash from the user. These apparatus may also be interconnected via a smart card or the like on which information can be recorded. As a digital signature scheme that is used in the embodiments of the present invention described below, it is possible to employ any of already established systems.

The electronic cash implementing method of the present invention will be described as being applied to the system configuration shown in FIG. 1.

First Embodiment (1) Processing for Issuance of Electronic Cash

Figure 2:
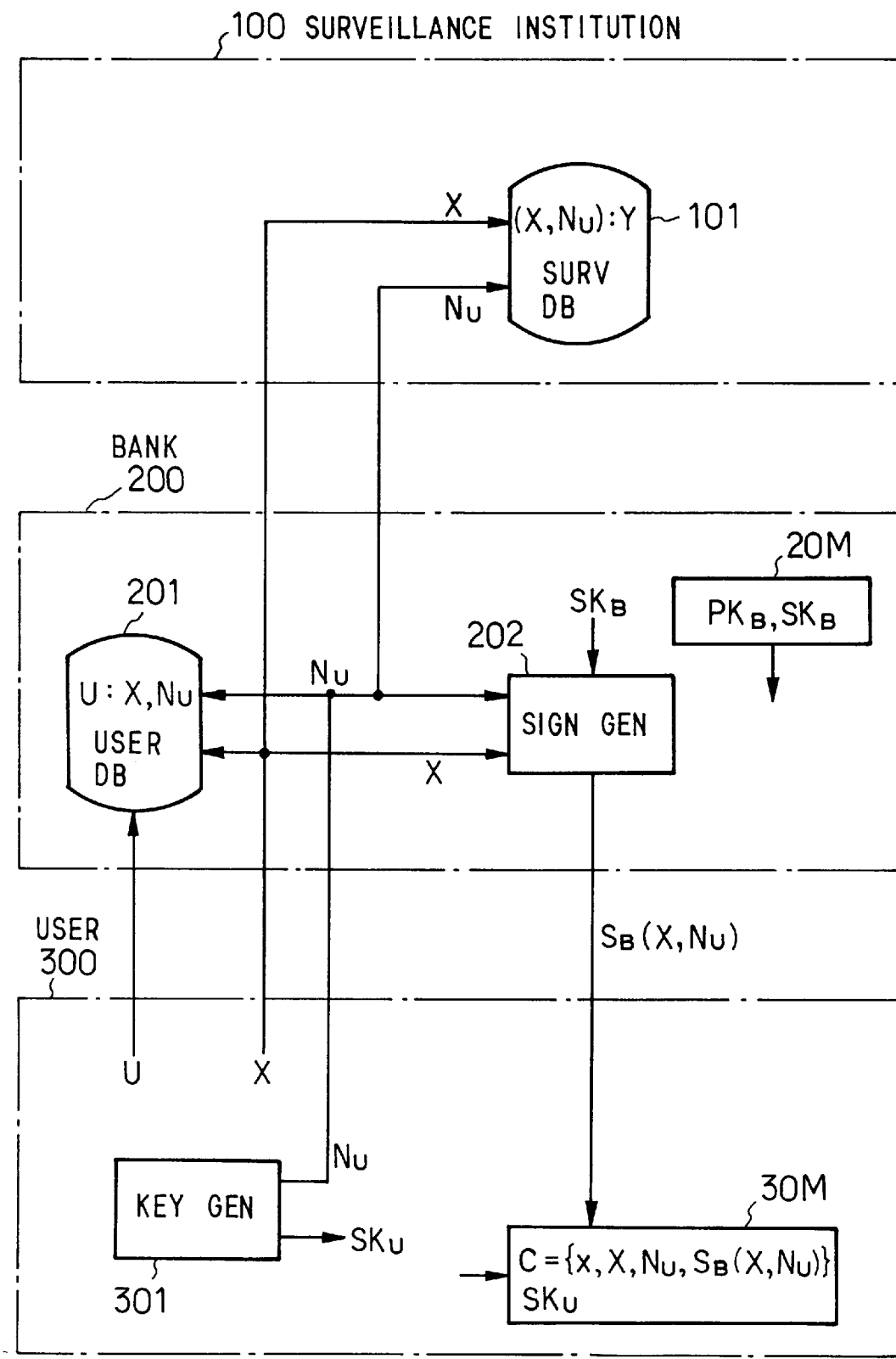
FIG. 2 is a block diagram functionally illustrating a method for issuing electronic cash in a first embodiment of the present invention.

A description will be given first, with reference to FIG. 2, of how the user has a bank issue electronic cash.

The bank 200 generates in advance a pair of public and secret keys $PK_B$ and $SK_B$ for digital signature (see, for example, Bruce Schnier, "Applied Cryptography," John Wiley, 1994) and stores it in a memory 20M. The secret key $SK_B$ and a signature generating function $S_B$ for generating a digital signature by using it are kept secret. A signature verification function $V_B$ for verifying the digital signature and a public key for verification $PK_B$ that is used therefor are made public.

The user carries out the following steps to request the bank 200 to draw out the same amount of money X as the face value of issued electronic cash from his bank account (corresponding to user information U).

Step 1: The user 300 generates a signature generating key $SK_U$ and a signature verification key $N_U$ in a digital signature key generating part 301 and stores them in a memory 30M. Hence, the signature verification key $N_U$ corresponds to the user information U.

The user 300 sends to the bank 200 a message requesting it to withdraw the same amount of money X as the face value of electronic cash and the user information (user identification information or the number of his bank account), together with the signature verification key $N_U$.

Step 2: The bank 200 checks the balance in the user's bank account, then subtracts the amount X from the user's balance, and records a pair of data X and $N_U$ as management data n in correspondence with the user's name U in a user database 201. In this instance, the withdrawal requesting message attached with a digital signature of the user 300, if any, is also recorded.

Next, the bank 200 calculates its digital signature $S_B(X, N_U)$ for the pair of data X and $N_U$ in a signature generating part 202 using the signature function $S_B$ and sends the digital signature $S_B(X,N_U)$ to the user 300 and the information $(X,N_U)$ to a surveillance institution 100.

Step 3: The user 300 stores in the memory 30M the bank's digital signature $S_B(X,N_U)$ and the information x, X and $N_U$ as electronic cash $C=\{x,X,N_U,S_B(X,N_U)\}$ of the face value X and the balance x. The initial value of the balance x is equal to the face value X.

Step 4: The surveillance institution 100 registers the data $(X,N_U)$ as management data n in a surveillance database 101. In this case, the initial value of the sum total Y of past payments y of the electronic cash corresponding to the information $(X,N_U)$ management data n is recorded as Y=0 in correspondence with the data $(X,N_U)$.

While in the above the signature verification key $N_U$ is generated by the user 300, it may be generated by a different institution such as the surveillance institution 100 or the bank 200, in which case the signature verification key $N_U$ is generated by the surveillance institution or the bank in response to the request for issuance of electronic cash, in advance, and is sent to the user 300.

(2) Payment with Electronic Cash

Figure 3:
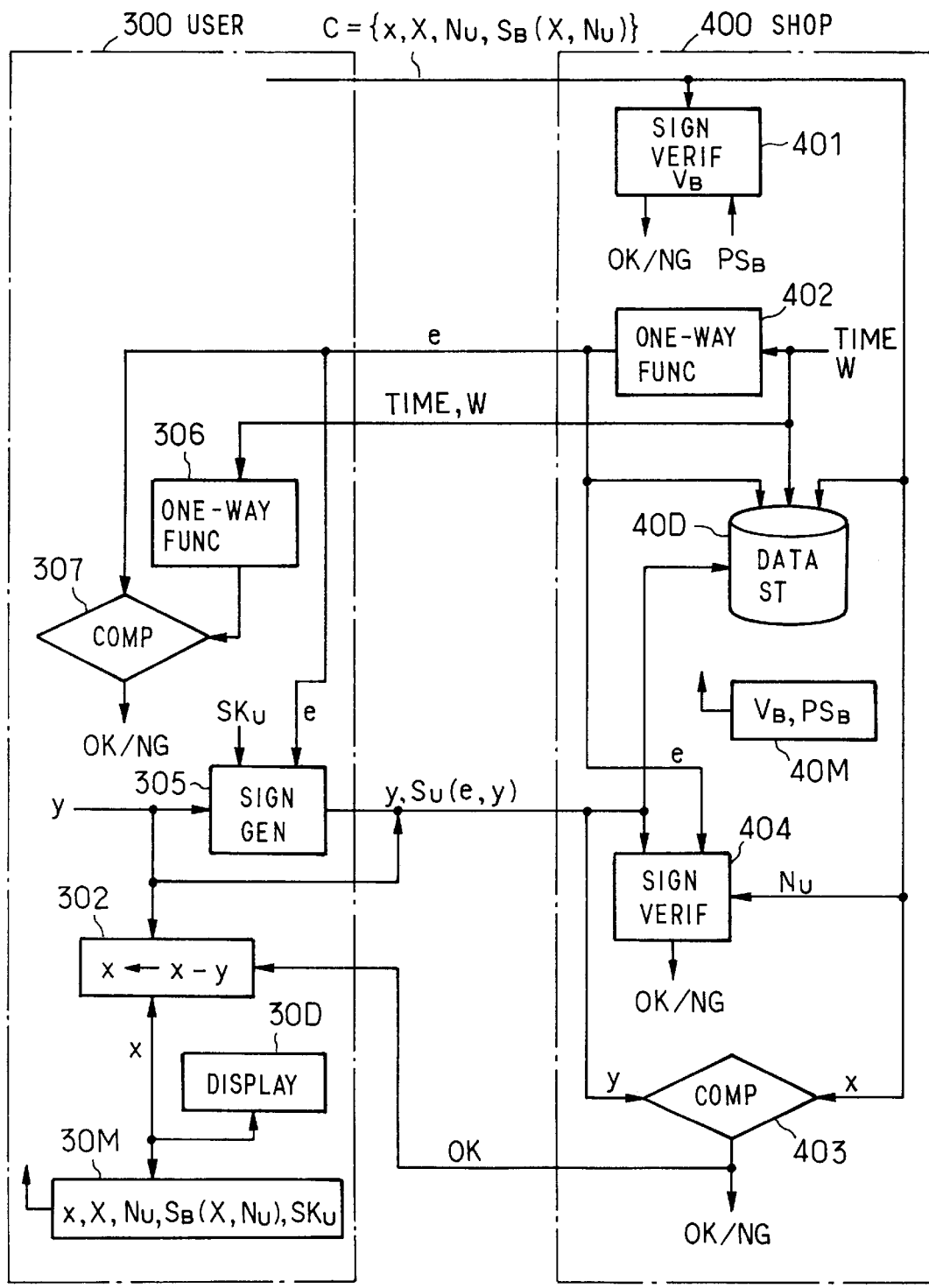
FIG. 3 is a block diagram functionally illustrating a method for payment of electronic cash in the first embodiment of the present invention.

Next, a description will be given, with reference to FIG. 3, of how the user 300 pays the amount of money y (y≦x) to a shop 400 with the electronic cash C of the face value X and the balance x and containing the pair of the signature verification key $N_U$ of the user 300 and the signature $S_B(X,N_U)$ issued from the bank 200.

Step 1: The user 300 displays on a display part 30D the balance x read out of the memory 30M and makes sure that the balance x is more than the amount of money y to be paid, and then sends the electronic cash $C=\{x,X,N_U,S_B(X,N_U)\}$ to the shop 400.

Step 2: The shop 400 verifies the validity of the signature $S_B(X,N_U)$ of the electronic cash issuer (the bank 200) by a signature verification part 401 using the signature verification key $PS_B$ read out of the memory 40M. If the signature is valid, the shop 400 generates inquiry information e=f (TIME,W) for verification from time TIME and information W corresponding to the shop 400 by a one-way function calculating part 402 using a one-way function f, and the shop 400 sends the information TIME, W and e to the user 300.

Step 3: The user 300 verifies the validity of the inquiry information e=f(TIME,W) by a one-way function calculating part 306 and a comparison part 307. If it is valid, the user 300 calculates by a signature generating part 305 a user's signature $S_U(e,y)$ for the information e sent thereto and the payment y (y≦x) and sends the information y and $S_U(e,y)$ to the shop 400.

Step 4: The shop 400 verifies the validity of the user signature $S_U(e,y)$ and the payment y by the signature verification part 404 using the inquiry information e and the signature verification key $N_U$ and verifies y≦x by a comparison part 403. If either of them is valid, the shop 400 approves the payment of the amount y of money concerned with electronic cash and sends the decision result OK to the user 300, and if at least one of them is invalid, the shop 400 sends the decision result NG declining the payment with electronic cash. Further, the shop 400 holds the communication data $H=\{x,X,N_U,S_B(X,N_U),TIME,W,e,y,S_U(e,y)\}$ between it and the user 300 in a shop data storage 40D for the subsequent settlement of accounts.

Incidentally, the shop 400 may verify the validity of the bank's signature $S_B(X,N_U)$ after sending the data TIME, W and e to the user 300.

Step 5: When receiving the decision result OK from the shop 400, the user 300 updates, by a subtract part 302, the balance x in the memory 30M with x←x−y.

(3) Settlement of Accounts

Figure 4:
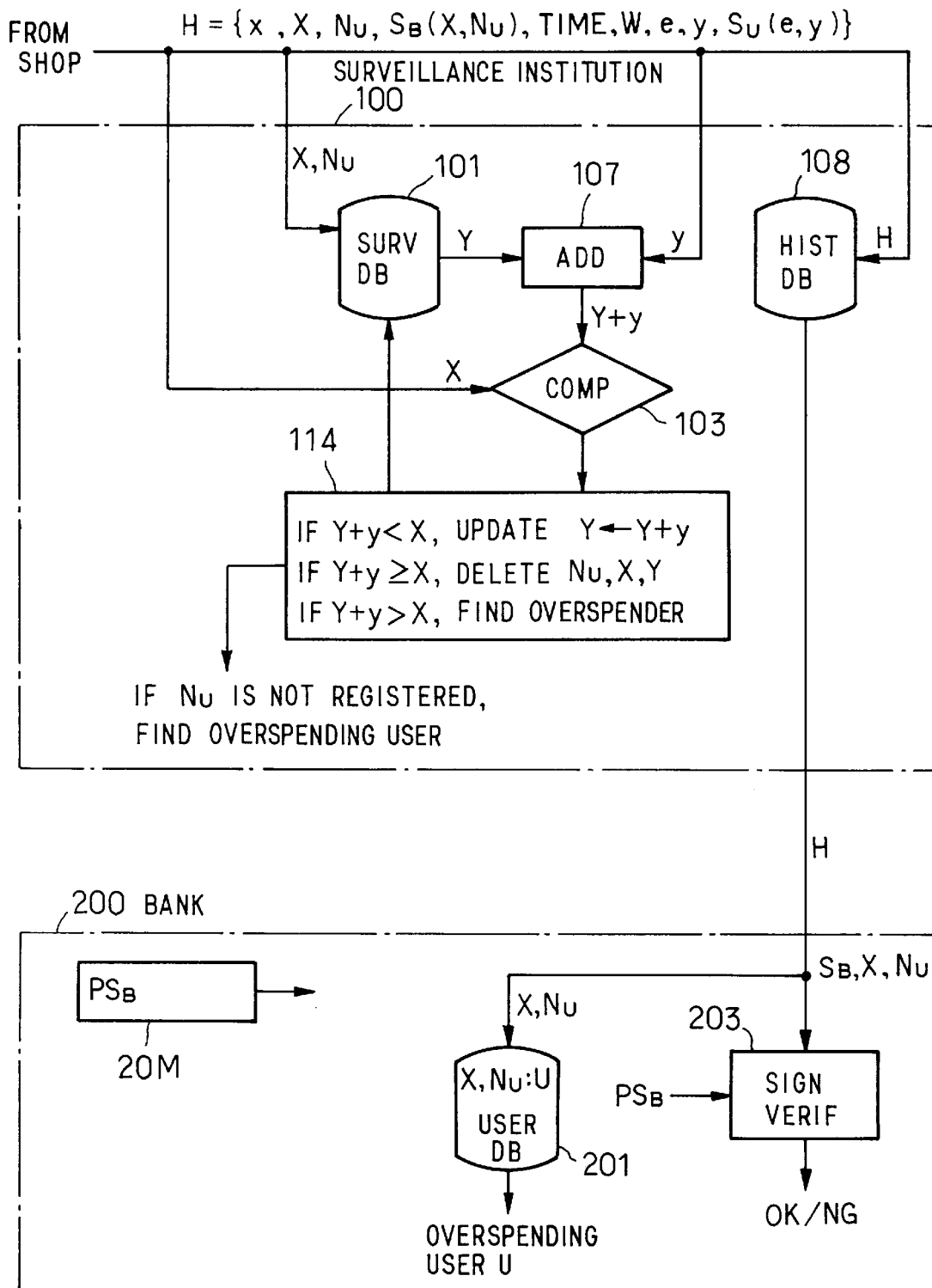
FIG. 4 is a block diagram functionally illustrating a method for settlement of accounts by electronic cash in the first embodiment of the present invention.

Turning next to FIG. 4, a method for settlement of accounts between the shop 400 and the bank 200 will be described.

Step 1: In the first place, the shop 400 sends all communication data $H=\{x,X,N_U,S_B(X,N_U),TIME,W,e,y,S_U(e,y)\}$ between the shop and the user 300 to the surveillance institution 100 via the bank 200 with which the shop 400 has an account (or directly).

Step 2: The control part 114 of the surveillance institution 100 makes a check to see if the pair $(X,N_U)$ of signature verification key $N_U$ of the user 300 and the face value X contained in the communication data H has been registered as management data in the surveillance database 101. If it has been registered, the control part 114 performs the operations with an adding part 107 and a comparison part 103, as follows:

The sum total Y of payments recorded corresponding to the management data $(X,N_U)$ is updated with Y+y→Y and a check is made again to see if the updated value Y is smaller than the face value X. Further, the control part 114 records the communication data H in a history database 108. It is preferable that the amount of data stored in the history database 108 be reduced by setting a term to each piece of history data H therein and eliminating therefrom the data when the term expires.

If the updated value Y is not in excess of the face value X, the control part 114 instructs the bank, which issued the electronic cash used, to transfer the amount of money y to the bank account specified by the shop 400. In this case, the bank with which the shop 400 has its account need not be the bank 200 that signed the pair of data $(X,N_U)$ of the user 300. In addition, if Y+y=X, the control part 114 eliminates the management data $(X,N_U)$ and corresponding Y from the surveillance database 101.

When the information $(X,N_U)$ has not been registered in the surveillance database 101, the surveillance institution 100 decides that the user 300 has overspent the electronic cash, and it performs processing for specifying the overspender. If Y+y>X, the control part 114 deletes the pair of data X and $N_U$ and the corresponding total sum Y from the surveillance database 101. Also in this case, the control part 114 decides that the user has overspent the electronic cash, and it carries out the overspender specifying processing.

Step 3: In the overspender specifying processing, prior to the elimination of the management data (X,$N_U$) from the database 101, the surveillance institution 100 retrieves from the history database 108 all communication data H concerning the overspent electronic cash that is used as evidence of overspending and sends the communication data H to the bank 200 that issued the electronic cash. The bank 200 verifies the validity of the evidence of overspending by a signature verify part 203 using the user's signature verification key $N_U$ and, if it is valid, specifies the overspender 300 corresponding to the user information U by retrieving the user database 201 by using the data (X,$N_U$) as a key word.

In the foregoing, the embodiment has been explained with the case where the user sends to the bank and further to the surveillance institution the management data (X,$N_U$) including signature verification key $N_U$ in an original form; however, in general, the signature verification key $N_U$ may be sent in any form transformed from the original form. This arbitrary form will hereinafter be expressed by N'=f($N_U$) and referred to as signature verification information. In the present invention, the user may send to the bank and further to the surveillance institution signature verification key information generally expressed by N'=f($N_U$). For example, the user may use a one-way function f to transform information including the signature verification key $N_U$ to N'=f($N_U$) and send (X,N') to the bank 200 and further to the surveillance institution 100 so as to be stored in the databases 201 and 101, respectively, as management data n.

In the above first embodiment, it is also possible to arrange such that the bank 200 generates compressed data n=h(X,$N_U$), as management data, using one-way hash function h, for instance, then stores the management data n in correspondence with the name U of the user 300 in the user database 201. In a similar manner, the surveillance institution 100 may produce compressed data n=h(X,$N_U$) and register it as the management data n in the surveillance database 101 in correspondence with the total sum of spent money Y. In such an instance, the surveillance institution 100 shown in FIG. 4 obtains the management data n by compressing the data (X,$N_U$) in the communication data H from the shop 400 with the same one-way hash function h and retrieves the database 101 with the management data n for the same management data n, that is, to see if the information (X,$N_U$) is pair of data (X,$N_U$) have been registered.

The procedure for the user 300 to make a payment to an arbitrary shop with the balance x of the electronic cash used as described above is exactly the same as the above-described procedure for payment between the user 300 and the shop 400, and the procedure for settlement of accounts between the shop and the surveillance institution 100 is also exactly the same as described above.

According to the electronic cash implementing method of the present invention, since the amount X of electronic cash issued by every bank 200 is reported to the surveillance institution 100, it is possible for the institution 100 to keep under its surveillance the total amount of electronic cash issued by the respective banks and to keep track of the total amount of circulation of the electronic cash.

Moreover, since what is required for the payment with electronic cash is only to make sure that the amount of money y to be paid is smaller than the current balance x, the procedure for the division use of electronic cash is far simpler than the procedure disclosed in the aforementioned U.S. Pat. No. 5,224,162 and the amount of communication therefor is also significantly small.

Another feature of the present invention resides in that the management data N=(X,$N_U$) registered in the surveillance database 101 for surveillance is erased when all the corresponding electronic cash is used up to the face value X. Hence, subsequent overspending of the electronic cash is found out at once since the data (X,$N_U$) of the electronic cash sent from a shop to the surveillance institution 100 for settlement is already erased from the database 101.

What is characteristic of this method is that since the management data (X,$N_U$) registered in the database 101 for surveillance is erased at the time when all the electronic cash is spent or its overspending is discovered, the registered management data (X,$N_U$) held in the database 101 is only those effective at that point in time. Accordingly, if the total amount of electronic cash issued remains constant to some extent, the amount of registered data to be held in the surveillance database 101 remains substantially constant and does not accumulate. In contrast to this, according to the conventional electronic cash system, every bank needs to keep lists of overspent electronic cash and spent electronic cash (that has a possibility for overspending in future) under surveillance; hence, the amount of data held under surveillance accumulates with an increase in the amount of electronic cash issued.

Next, a description will be given of the functional configurations of the user apparatus 300 and the surveillance institution 100 that are characteristic of the above-described first embodiment.

Figure 5:
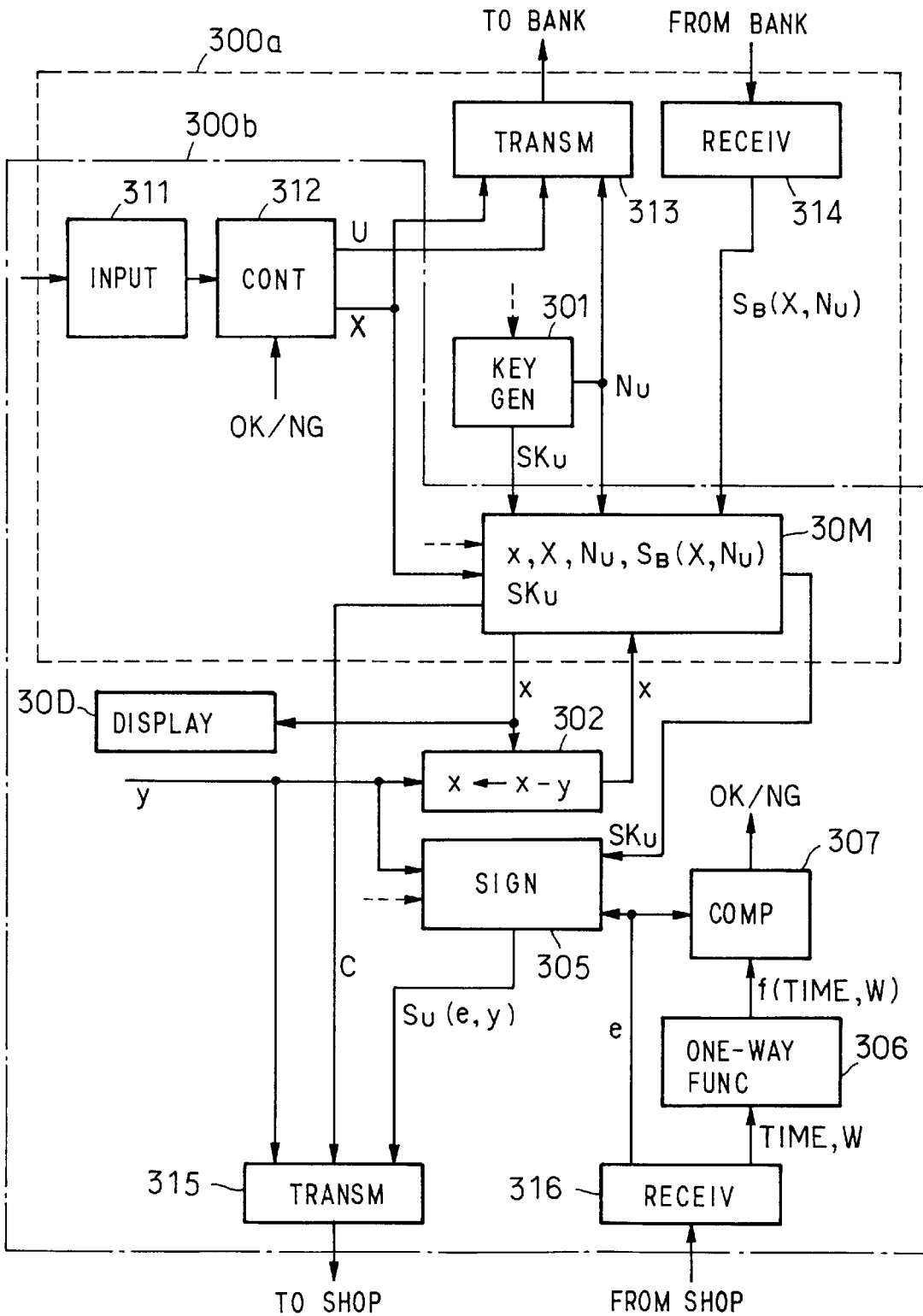
FIG. 5 is a block diagram illustrating the functional configuration of a user apparatus in the first embodiment of the present invention.

FIG. 5 illustrates a functional block diagram of the user apparatus for performing the procedure of the user 300 in the first embodiment. The user apparatus has such a configuration that functional parts 300a and 300b for processing by the user 300 for issuance of electronic cash and for his use of electronic cash, respectively, share an input part 311, a control part 312 and a memory 30M. The functional part 300a is made up of the input part 311, the control part 312 for controlling operations of respective parts, a key generating part 301, a transmitting part 313, a receiving part 314 and the memory 30M. When supplied with a command, the user information U and the face value X from the input part 311, the control part 312 sends the user information U and the face value X via the transmitting part 313 to the bank 200(B) to request it to issue electronic cash, while at the same time the control part 312 controls the key generating part 301 to generate the verification key $N_U$ and the signature key $SK_U$, which are stored in the memory 30M together with the face value X. Further, the key $N_U$ thus generated is sent to the bank 200.

When the receiving part 314 receives from the bank 200 the signature $S_B$(X,$N_U$) for the data (X,$N_U$), the control part 312 stores it in the memory 30M.

The functional part 300b for using electronic cash is made up of the input part 311, the control part 312, the memory 30M, a display part 30D, a subtracting part 302, a signature generating part 305, a one-way function part 306, a compare/decide part 307, a transmitting part 315 and a receiving part 316. When the amount of payment to the shop 400 is input via the input part 311, the balance x is read out of the memory 30M and is displayed on the display part 30D to make sure that the balance x is more than the amount of payment. Next, the electronic cash $C=\{x,X,N_U,S_B(X,N_U)\}$ of the face value X and the balance x is read out of the memory 30M and sent to the shop 400 via the transmitting part 315. Upon receiving via the receiving part 316 the inquiry information e, TIME and W sent from the shop 400 in response to the electronic cash C sent thereto, TIME and W are processed using a one-way function in the one-way function part 306 to obtain f(TIME,W), which is compared with the received information e in the compare/decide part 307 to determine if they match. If so, the signature $S_U(e,y)$ for the pair of information e and y is generated using the signature key $SK_U$ in the signature generating part 305 and the signature is sent to the shop 400 along with the amount of payment y. At the same time, the amount of payment y is subtracted from the balance x in the subtracting part 302 and the updated balance x is used to update the balance x stored in the memory 30M.

Figure 6:
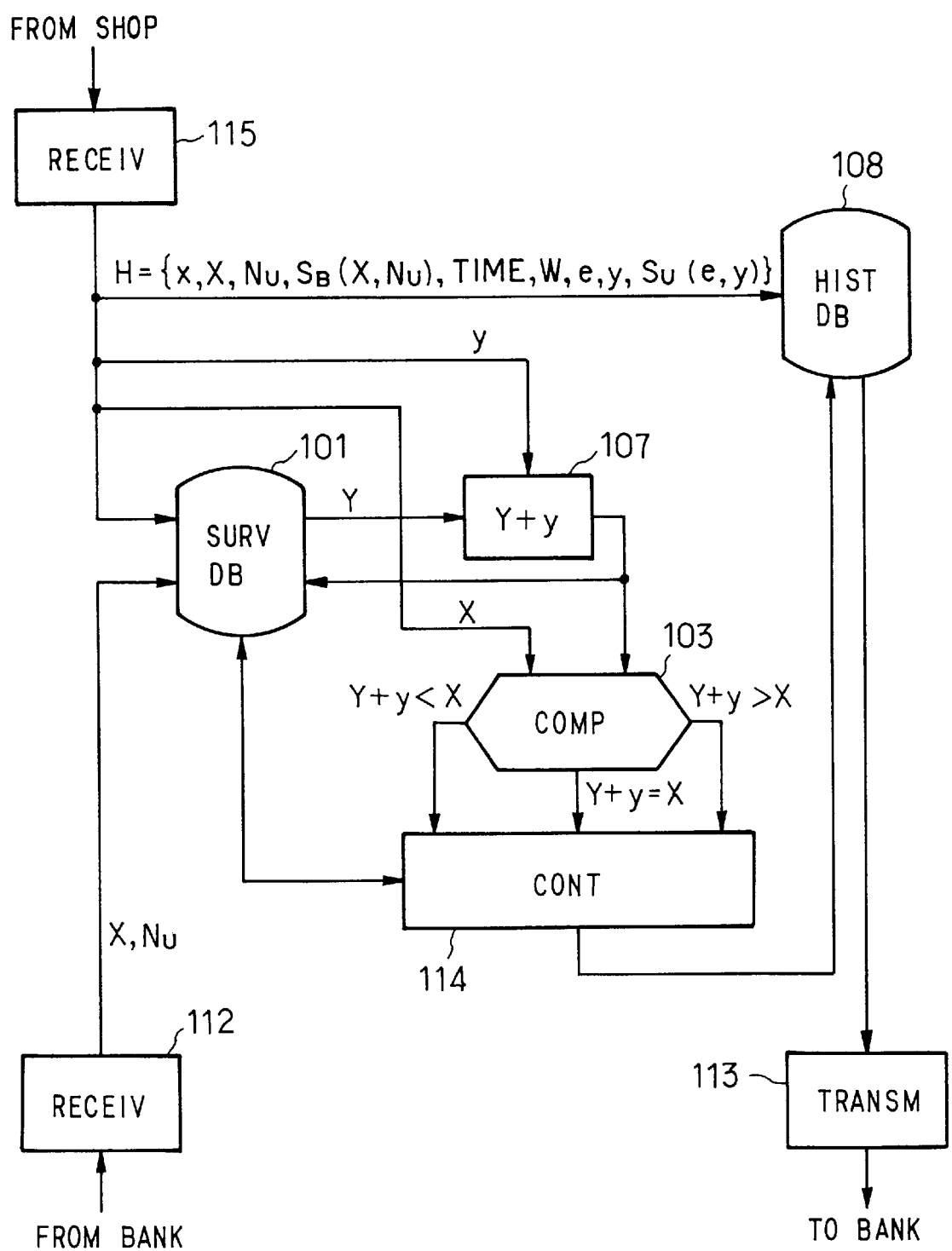
FIG. 6 is a block diagram illustrating the functional configuration of a surveillance institution apparatus in the first embodiment of the present invention.

The surveillance institution 100 comprises, as depicted in FIG. 6, the surveillance database 101, the history database 108, the comparison part 103, a control part 114 for controlling them, a receiving part 112, a transmitting part 113 and a receiving part 115. When the data $(X,N_U)$ from the bank 200 is received in the receiving part 112, the control part 114 registers the data $(X,N_U)$ in the surveillance database 101 and records the initial value Y=0 of the total amount of electronic cash used.

Thereafter, when the communication history data $H=\{x, X,N_U,S_B(X,N_U),TIME,W,e,y,S_U(e,y)\}$ for the procedure of payment with the electronic cash $C=\{x,X,N_U,S_B(X,N_U)\}$ is received from the shop 400 in the receiving part 115, the control part 114 retrieves the surveillance database 101 to see if the data $(X,N_U)$ in the received data has already been registered, and if not, the control part 114 decides that the payment with the electronic cash is improper and reports the data $(X,N_U)$ to the bank which issued the electronic cash. If the data $(X,N_U)$ has already been registered, the total amount of money used Y in the surveillance database 101, corresponding to the data $(X,N_U)$, and the amount of payment y in the data H are added together in the adding part 107. The result of this addition is compared in the comparison part 103 with the face value X in the data H. If the result of this comparison is Y+y>X, the control part 114 decides that the payment with the electronic cash is improper and erases the data $(X,N_U)$ and the corresponding face value X from the surveillance database 101 and, at the same time, sends the data $(X,N_U)$ via a transmitting part 113 to the bank that issued the electronic cash. If Y+y<X, the control part 114 decides that the use of the electronic cash is proper, then records the data H in the history database 108, and updates the corresponding total amount of money used Y in the surveillance database 108 with the result of addition in the adding part 107. When Y+y=X, it means that all the face value X of the electronic cash is spent, and consequently, the management data $(X,N_U)$ and the corresponding amount of money Y are erased from the surveillance database 101.

In the above first embodiment, since a new signature verification key $N_U$ is generated every time the same user requests an issuance of electronic cash, a plurality of electronic cashes issued to the same user can be distinguished from each other even if the face values X of the electronic cashes are identical. In order to allow the same user to use the same key $N_U$ for a plurality of electronic cashes, a different variable number R may be generated for each electronic cash, and data $(X,N_U,R)$ may be used instead of $(X,N_U)$. That is, the bank 200 records, in the user database 201, data $(X,N_U,R)$ or $n=h(X,N_U,R)$ in correspondence with user's name U. Furthermore, the surveillance institution 100 registers, in the surveillance database 101, data $(X,N_U,R)$ or $n=h(X,N_U,R)$ instead of $(X,N_U)$. When using the electronic cash, the user sends the electronic cash C including data $(X,N_U,R)$ and $SB(X,N_U,R)$. When making a settlement on accounts, the surveillance institution checks if the data $(X,N_U,R)$ included in the data H or $n=h(X,N_U,R)$ produced from $(X,N_U,R)$ has been registered in the surveillance database 101.

Second Embodiment

Figure 7:
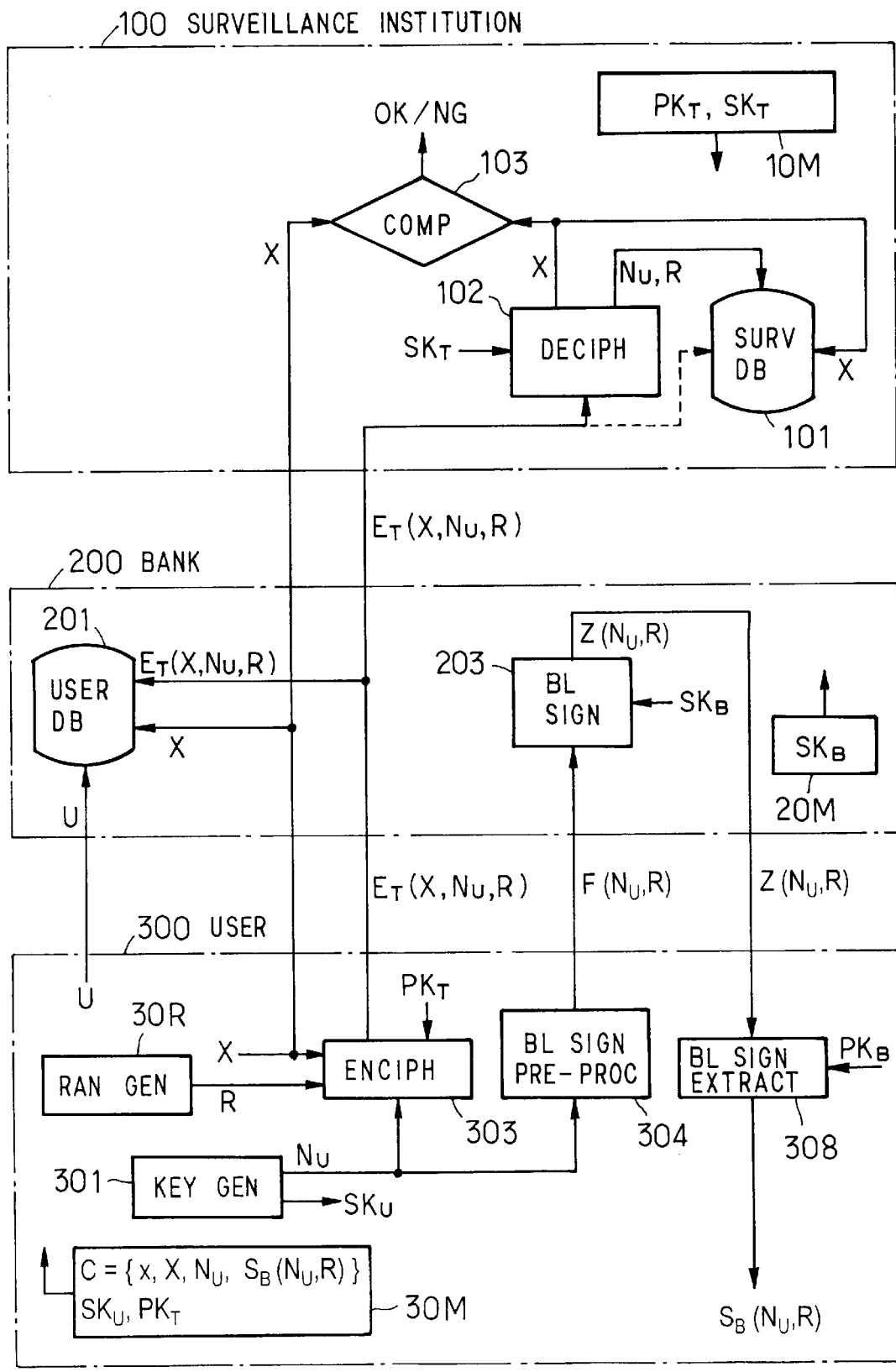
FIG. 7 is a block diagram functionally illustrating a method for issuing electronic cash in a second embodiment of the present invention.
Figure 8:
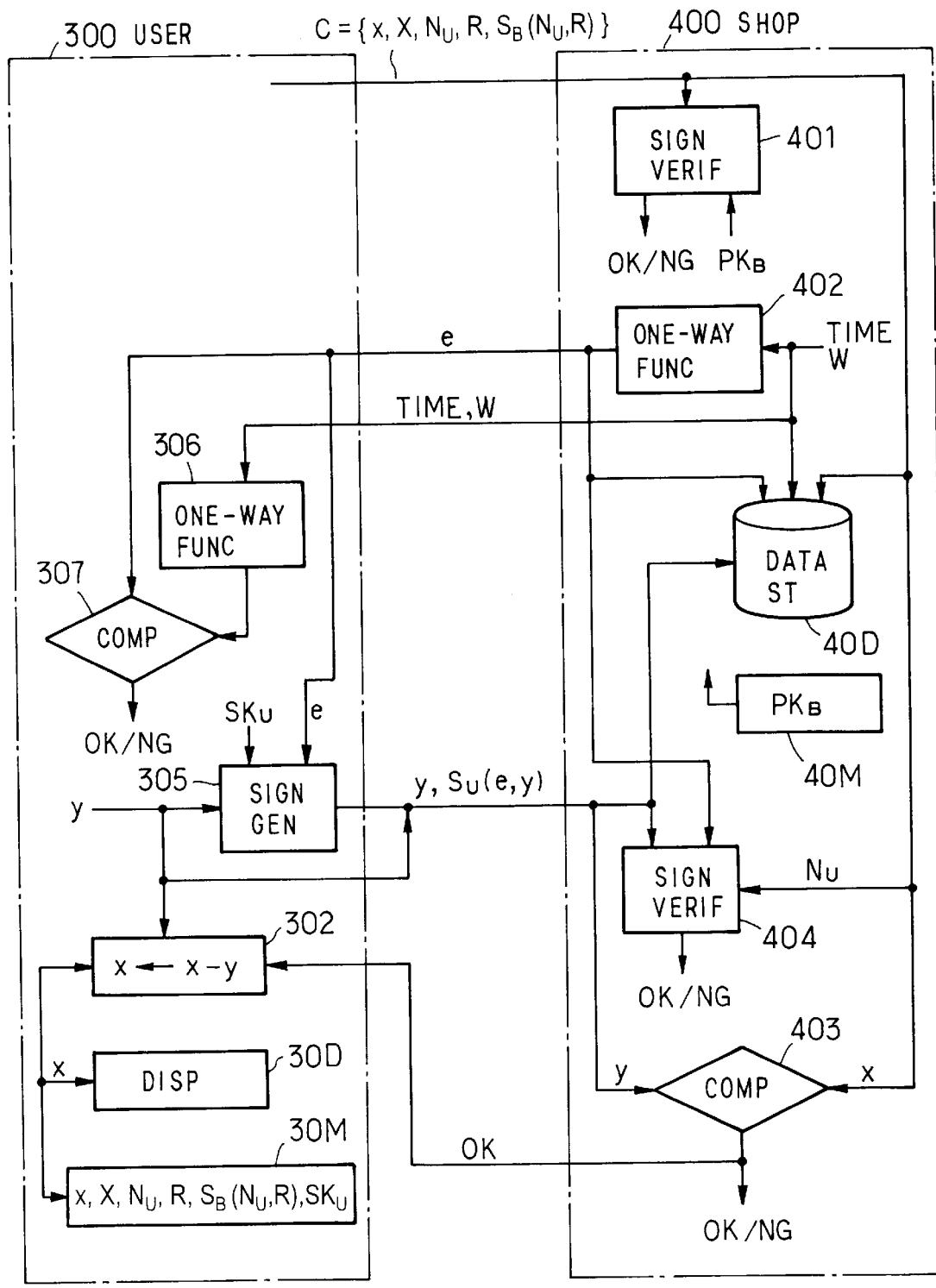
FIG. 8 is a block diagram functionally illustrating a method for payment of electronic cash in the second embodiment of the present invention.
Figure 9:
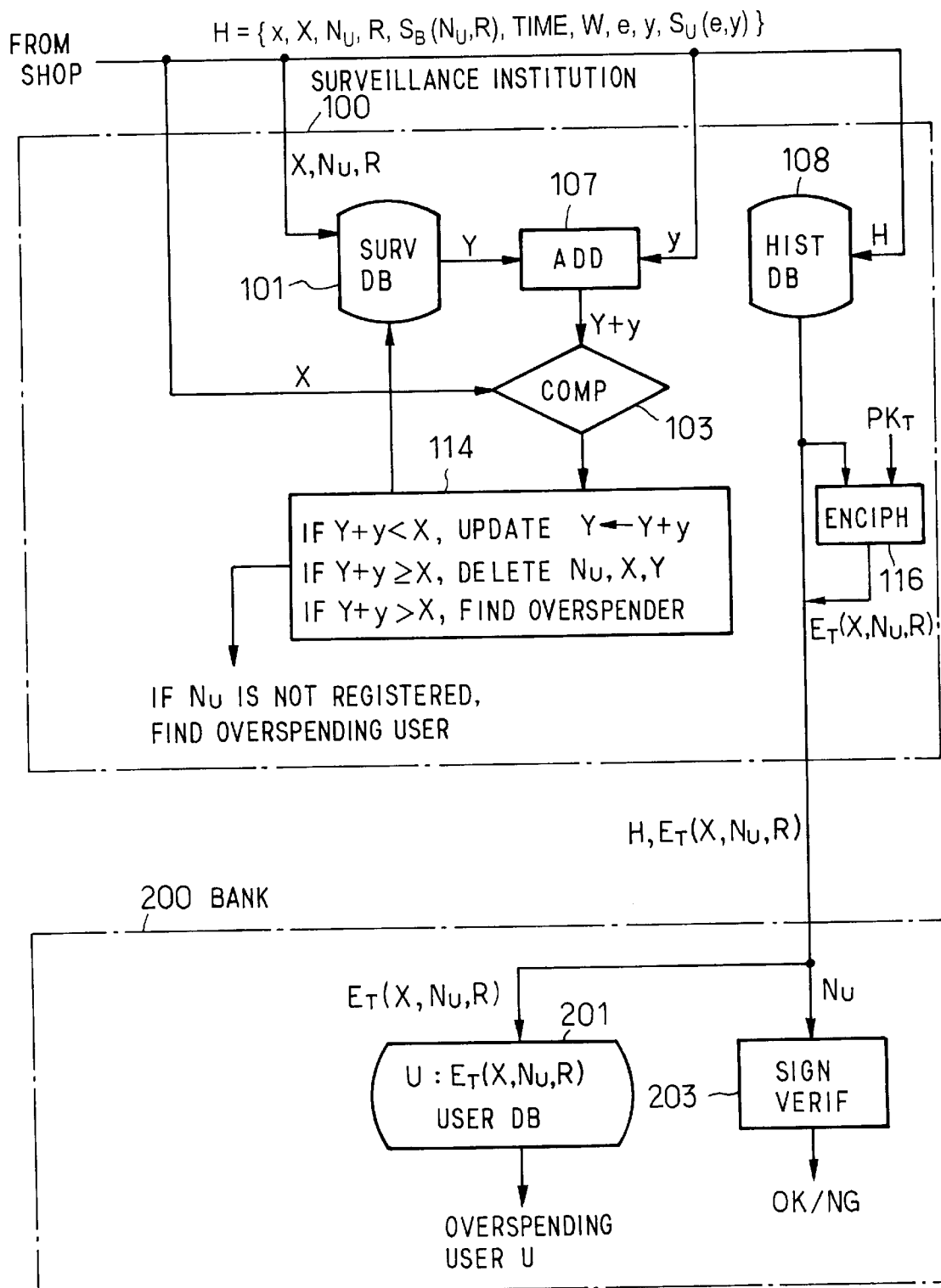
FIG. 9 is a block diagram functionally illustrating a method for settlement of accounts by electronic cash in the second embodiment of the present invention.

In the embodiment described above with reference to FIGS. 2, 3 and 4, since the user presents his signature verification key $N_U$ to the bank when requesting it to issue electronic cash, the bank knows the correspondence between the user information U and the data $(X,N_U)$. On the other hand, the shop, when paid with electronic cash, receives the data $(X,N_U)$ from the user. Then, in the event that the bank conspires with the shop, the former can get the information U of the user who spent the electronic cash at the latter. Thus, the embodiment described above with respect to FIGS. 2, 3 and 4 does not ensure sufficient user privacy. Turning now to FIGS. 7, 8 and 9, an embodiment improved in this respect will be described below.

According to this embodiment, in the processing for issuance of electronic cash, the user presents his data $(X,N_U)$ after enciphering it by an enciphering key $PK_I$ of the surveillance institution so as to prevent it from becoming known to the bank. Further, in the procedure for the bank to issue electronic cash the user attaches a blind signature to the electronic cash issued from the bank so that the user's signature verification key $N_U$ does not become known to the bank. This embodiment will be described in detail with reference to FIGS. 7, 8 and 9.

(1) Processing for Issuance of Electronic Cash

A description will be given first, with reference to FIG. 7, of how the user has the bank issue electronic cash.

Let it be assumed that the surveillance institution 100 generates in advance a public key $PK_T$ and a secret key $SK_T$ of a public key cryptosystem and holds them in the memory 10M and that the bank 200 generates and holds a pair of public and secret keys $PK_B$ and $SK_B$ of the blind signature scheme corresponding to each face value X.

The surveillance institution 100 makes public encipher function $E_T$ for encipherment of the public key and the public key $PK_T$ but keeps in secrecy a secret key $SK_T$ for deciphering use that forms a counterpart to the public key $PK_T$ and a decipher function $D_T$ that uses the secret key $SK_T$.

The bank 200 makes public the public key $PK_B$ for blind signature use and the signature verification function $V_B$ but keeps in secrecy the secret key $SK_B$ in a memory 20M for blind signature use and the signature generating function $S_B$ that uses the secret key $SK_B$.

The user 300 goes through the following steps to take the procedure for requesting the bank 200 to withdraw the amount of money of the face value X of electronic cash from the user's bank account.

In the following, however, this embodiment will be explained with the case where the user uses the same key $N_U$ for each issuance of electronic cash. In this case, therefore, the aforementioned variable number (or a random number) R is used together with data $(X,N_U)$ so that plural electronic cashes possessed by the same user can be distinguished from each other.

Step 1: the user 300 uses the digital signature key generating part 301 to generate the signature generating key $SK_U$ and the signature verification key $N_U$, which are held in a memory 30M. Incidentally, in this embodiment the user 300 employs, as a variable number, a random number R generated by a random generating part 30R so as to increase security, but the random number R can be substituted with any other variable number.

Next, the user 300 uses the enciphering public key $PK_T$ of the surveillance institution 100 held in the memory 30M to calculate data $E_T(X,N_U,R)$ in an encipher part 303 that calculates the encipher function $E_T$ made public, and the user 300 sends to the bank 200 a message requesting it to withdraw the amount of money X from the user's bank account, together with the data $E_T(X,N_U,R)$. It is desirable that the message be authenticated with the digital signature of the user 300, for instance. In the same way as explained with respect to the first embodiment, the user 300 may produce signature verification key information $N'=f(N_U,R)$ and send data $E_T(X,N')$ to the bank 200 and the surveillance institution 100 instead of sending the data $E_T(X,N_U,R)$.

Step 2: The bank 200 checks the balance in the user's account, then reduces the amount X from the balance, and records the data $E_T(X,N_U,R)$ as management datan n in correspondence with the user's name U in the user database 201. If a withdrawal request message added with the signature of the user 300 exists, it is also recorded. The bank 200 does not have the secret key $SK_T$ for deciphering the enciphered data $E_T(X,N_U,R)$, and hence it cannot learn the data $(X,N_U,R)$.

Then the bank 200 sends data $\{X,E_T(X,N_U,R)\}$ to the surveillance institution 100.

Step 3: The surveillance institution 100 uses a decipher part 102 of the decipher function $D_T$ using a secret key $SK_T$ to decipher the enciphered data $E_T(X,N_U,R)$ into $(X,N_U,R)$. Next, the surveillance institution 100 makes a comparison, by the comparison part 103, between the amount of money X sent from the bank 200 and the X obtained by the decipherment to see if they are identical. If so, the surveillance institution 100 registers in the database 101 a set of data $(X,N_U,R)$ as management data and stores the initial value Y=0 of the total amount of spent money Y in correspondence with the management data.

Step 4: The user 300 generates data $F(N_U,R)$ by a blind signature generating part 304 through the use of the blind signature public key $PK_B$ of the bank corresponding to the face value X (this processing being called blind signature pre-processing) and sends the data $F(N_U,R)$ to the bank 200.

The bank 200 inputs the data $F(N_U,R)$ into the blind signature generating part 203, wherein the blind signature secret key $SK_B$ is used to generate a blind signature $Z(N_U,R)$, which is sent to the user 300.

The user 300 derives a bank's signature $S_B(N_U,R)$ from the blind signature $Z(N_U,R)$ in a blind signature extracting part 308 by the blind signature public key $PK_B$ (this processing being called blind signature post-processing).

As for the implementation of the blind signature, a system using an RSA scheme is introduced in Chaum, Fiat and Naor, "Untraceable electronic Cash," Proc. Of CRYPTO '88 and a blind signature using a Schnorr scheme is set forth in T. Okamoto, "Probably Secure and Practical Identification Schemes and Corresponding Signature Schemes," Appendix B, Proc. Of CRYPTO '92, pp.31–53, 1993.

Then, the user 300 stores the data $C=\{x,X,N_U,R,S_B(N_U,R)\}$ as electronic cash of the face value X and the balance x in the memory 30M. The initial value of the balance x in this case is equal to the face value X.

While in this second embodiment the user 300 generates the signature verification key $N_U$, provision may be made to generate it by the surveillance institution 100, for instance. In such an instance, the user 300 creates an encipher key $K_U$ and sends data $E_T(K_U)$ to the surveillance institution 100 via the bank 200. The surveillance institution 100 deciphers the data $E_T(K_U)$ to obtain an encipher key $K_U$ then enciphers the key $N_U$ by the key $K_U$ into $E_K(N_U)$, and sends it to the user 300 via the bank 200. The user 300 deciphers the received data $E_K(N_U)$ by the encipher key $K_U$ to obtain the signature verification key $N_U$.

(2) Payment with Electronic Cash

Turning next to FIG. 8, a description will be given of the case where the user 300 pays the amount of money y (y≦x) to the shop 400, using a pair of user signature verification key $N_U$ and bank signature $S_B(N_U,R)$ as the electronic cash C of the face value X and the balance x (initial value x=X). It should be noted that in the blind signature scheme, it is possible to produce a unique pair of keys $SK_B$ and $PK_B$ in correspondence with each of a desired number of face values X. This means that the keys $SK_B$ and $PK_B$ to be used in the blind signature represent a face value X and, therefore, the signature $S_B(N_U,R)$ contains information on both the signature key $N_U$ and the face value X.

Step 1: The user 300 displays on the display part 30D the balance x read out of the memory 30M to make sure that the balance x is more than the amount of money y which the user 300 is to use, and sends the electronic cash $C=\{x,X,N_U,R,S_B(N_U,R)\}$ to the shop 400.

Step 2: the shop 400 verifies the validity of the signature $S_B(N_U,R)$ of the electronic cash issuer (i.e. The bank 200) by the signature verification function $V_B$ in the signature verification part 401 using a public key $PK_B$ corresponding to the face value X. If the bank signature is valid, the shop 400 generates a challenge information e=f (TIME,W) for verification from any desired information such as the time TIME and the shop information W corresponding to the shop 400 by using the one-way function f in the one-way function calculating part 402 and the shop 400 sends data TIME, W and e to the user 300.

Step 3: The user 300 uses the one-way function calculating part 306 and the comparison part 307 to verify the validity of the challenge information e=f(TIME,W). If the information is valid, the user 300 uses the signature generating part 305 to calculate the challenge information e sent thereto and the user signature $S_U(e,y)$ for the amount of payment y (y≦x) and sends the amount of payment y and the user signature $S_U(e,y)$ to the shop 400.

Step 4: The shop 400 uses the signature verification part 404 to verify the validity of the user signature $S_U(e,y)$ and the amount of payment y through utilization of the challenge information e and the signature verification key $N_U$ and verifies y≦x by the comparison part 403. If either of them is valid, the shop 400 approves the payment of the amount of money y with electronic cash and sends the decision result OK to the user 300. Further, the shop 400 holds the communication data $H=\{x,X,N_U,R,S_B(N_U,R),TIME,W,e, y,S_U(e,y)\}$ between it and the user 300 in a shop data storage part 40D for the subsequent settlement of accounts. If at least one of them is invalid, the shop 400 sends the decision result NG declining the payment with electronic cash.

Incidentally, the shop 400 may verify the validity of the bank's signature $S_B(N_U,R)$ after sending the data TIME, W and e to the user 300.

Step 5: When receiving the decision result OK from the shop 400, the user 300 updates, by the subtract part 302, the balance x in the memory 30M with x←x−y.

(3) Settlement of Accounts

Referring now to FIG. 9, a method for settlement of accounts between the shop 400 and the bank 200 will be described.

Step 1: In the first place, the shop 400 sends all communication data H={x,X,$N_U$,R,$S_B$($N_U$,R),TIME,W,e,y,$S_U$(e,y)} between the shop 400 and the user 300 to the surveillance institution 100 via the bank 200 together with the name of the bank with which the shop 400 settles accounts.

Step 2: The control part 114 of the surveillance institution 100 makes a check to see if the set of data (X,$N_U$,R) composed of the face value X, the signature verification key $N_U$ of the user 300 and the random number R contained in the communication data H has been registered as management data in the surveillance database 101. If it has been registered, the control part 114 performs the operations with the adding part 107 and the comparison part 103 as follows:

The sum total payments Y recorded corresponding to the management data (X,$N_U$,R) is updated with Y+y→Y and a check is made again to see if the updated value Y is smaller than the face value X. Further, the control part 114 records the communication data H in the history database 108.

If the updated value Y is not in excess of the face value X, the control part 114 instructs the bank 200, which issued the electronic cash used, to transfer the amount of money y to the bank account specified by the shop 400. In this case, the bank with which the shop 400 has its account need not necessarily be the bank 200 that attached the blind signature to the verification key $N_U$ of the user 300 (i.e. the bank that issued the electronic cash).

If Y+y=X, the control part 114 eliminates the management data (X,$N_U$,R) and the corresponding value Y from the surveillance database 101.

When the data (X,$N_U$,R) has not been registered in the surveillance database 101, the surveillance institution 100 decides that the user 300 has overspent the electronic cash, and it performs processing for specifying the overspender. If Y+y>X, the control part 114 deletes the management data (X,$N_U$,R) and the corresponding data Y from the surveillance database 101. Also in this case, the control part 114 decides that the user has overspent the electronic cash, and it carries out the overspender specifying processing.

Step 3: In the overspender specifying processing, the communication data H that is used as evidence of overspending is retrieved from the history database 108 and data (X,$N_U$,R) in the communication data H is enciphered by an enciphering part 116 with the public key $PK_T$ to reproduce enciphered data $E_T$(X,$N_U$,R), which is sent together with the information H as evidences to the bank 200 that issued the electronic cash. The bank 200 verifies the validity of the evidences $S_U$(e,y), $S_B$($N_U$,R) in the received communication data H by the signature verify part 203 using the user's signature verification key $N_U$ and the bank's public key $PK_B$ and, if they are valid, specifies the overspender 300 corresponding to the user information U by retrieving the user database 201 by using the data $E_T$(X,$N_U$,R) as a key word. Alternatively, an encipher part may be provided in the bank 200 instead of the encipher part 116 in the surveillance institution 100.

If the shop 400 wants to keep its real name W unknown to the surveillance institution 100, the real name W may be substituted with a pseudonym W' in the communication data H which the shop 400 sends to the surveillance institution 100. Since the shop 400 reports the correspondence between 400 and W' to the bank with which the shop 400 settles accounts, the bank judges that the request for payment into the bank account W', received from the surveillance institution 100, is a request for payment into the account of the shop 400.

In the above second embodiment, the surveillance institution 100 has been explained as to register the data (X,$N_U$, R) obtained by deciphering the data $E_T$(X,$N_U$,R) received from the bank 200 (FIG. 7) and, when conducting the settlement of accounts, data in the surveillance database is checked if the data (X,$N_U$,R) in the received communication data H has been registered and, furthermore, when specifying the overspender, the data (X,$N_U$,R) in the communication data H is enciphered to produce $E_T$(X,$N_U$,R) to be sent to the bank 200. However, it is also possible to arrange such that when registering in the surveillance database, the enciphered data $E_T$(X,$N_U$,R) is registered as management data instead of the deciphered data (X,$N_U$,R) as indicated by a broken line in FIG. 7 and when conducting the settlement of accounts, data (X,$N_U$,R) in the communication data H received from the shop 400 is enciphered to obtain $E_T$(X,$N_U$,R) which is used to find if the surveillance database 101 contains the same data $E_T$(X,$N_U$,R), and further when specifying the overspender, the data $E_T$(X,$N_U$,R) is sent together with H to the bank 200.

Next, a description will be given of the functional configurations of the user apparatus 300 and the surveillance institution 100 characteristic of the second embodiment described above.

Figure 10:
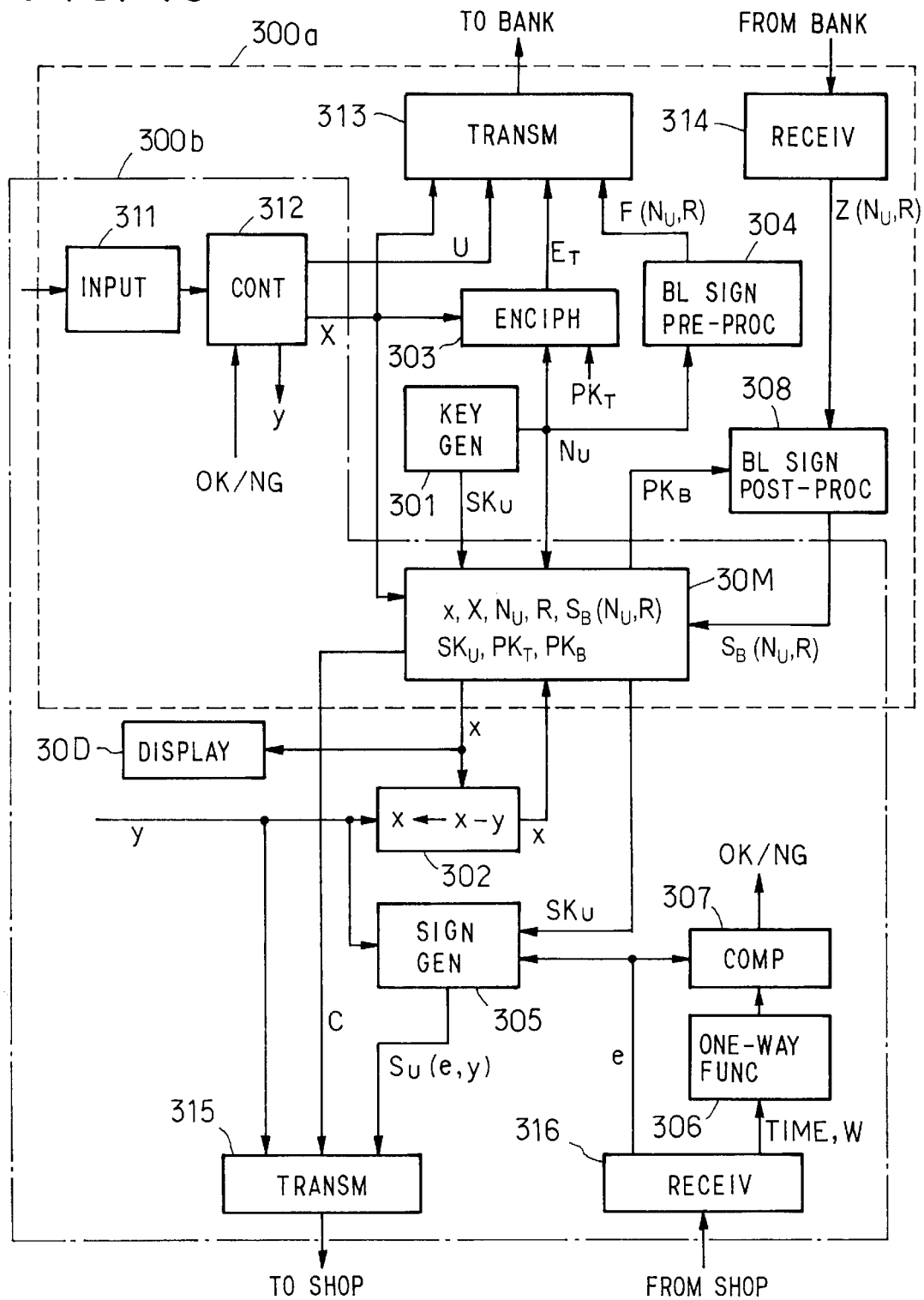
FIG. 10 is a block diagram illustrating the functional configuration of a user apparatus in the second embodiment of the present invention.

FIG. 10 is a functional block diagram of the user apparatus for performing the procedure of the user 300 in the second embodiment. The user apparatus has such a configuration that functional parts 300a and 300b for processing by the user 300 for issuance of electronic cash and for his use of electronic cash, respectively, share the input part 311, the control part 312 and the memory 30M.

The functional part 300a is made up of the input part 311, the control part 312 for controlling operations of respective parts, the key generating part 301, the transmitting part 313, the receiving part 314 and the memory 30M. When supplied with a command, the user information U and the face value X from the input part 311, the control part 312 sends the user information U and the face value X via the transmitting part 313 to the bank 200 to request it to issue electronic cash, while at the same time the control part 312 controls the key generating part 301 to generate the verification key $N_U$ and the signature key $SK_U$, which are stored in the memory 30M together with the face value X. Further, the control part 312 controls the encipher part 303 to encipher the data (X,$N_U$,R) by the encipher public key $PK_T$ of the surveillance institution 100 to obtain $E_T$(X,$N_U$,R), which is sent to the bank 200. Besides, the control part 312 controls the blind signature pre-processing part 304 to pre-process the verification key $N_U$ and the random number R by the public key $PK_B$ for the blind signature of the bank and sends the resulting data F($N_U$,R) to the bank 200.

When the receiving part 314 receives from the bank 200 the blind signature Z($N_U$,R) for the data F($N_U$,R), the control part 312 controls the blind signature post-processing part 308 to extract the bank's signature $S_B$($N_U$,R) by the public key $PK_B$ for the bank's blind signature and stores it in the memory 30M.

The functional part 300b for using electronic cash is made up of the input part 311, the control part 312, the memory 30M, the display part 30D, the subtracting part 302, the signature generating part 305, the one-way function part 306, the compare/decide part 307, the transmitting part 315 and the receiving part 316. When the amount of payment to the shop 400 is input via the input part 311, the balance x is read out of the memory 30M and is displayed on the display part 30D to make sure that the balance x is more than the amount of payment. Next, the electronic cash C={x,X,$N_U$, $S_B$($N_U$,R)} of the face value X and the balance x is read out of the memory 30M and sent to the shop 400 via the transmitting part 315. Upon receiving via the receiving part 316 the challenge information e, TIME and W sent from the shop 400 in response to the electronic cash C sent thereto, TIME and W are processed using a one-way function in the one-way function part 306 to obtain f(TIME,W), which is compared with the received information e in the compare/decide part 307 to determine if they match. If so, the signature $S_U(e,y)$ for the pair of information e and y is generated using the signature key $SK_U$ in the signature generating part 305 and the signature thus generated is sent to the shop 400 along with the amount of payment y. At the same time, the amount of payment y is subtracted from the balance x in the subtracting part 302 and the updated balance x is used to update the balance x stored in the memory 30M.

Figure 11:
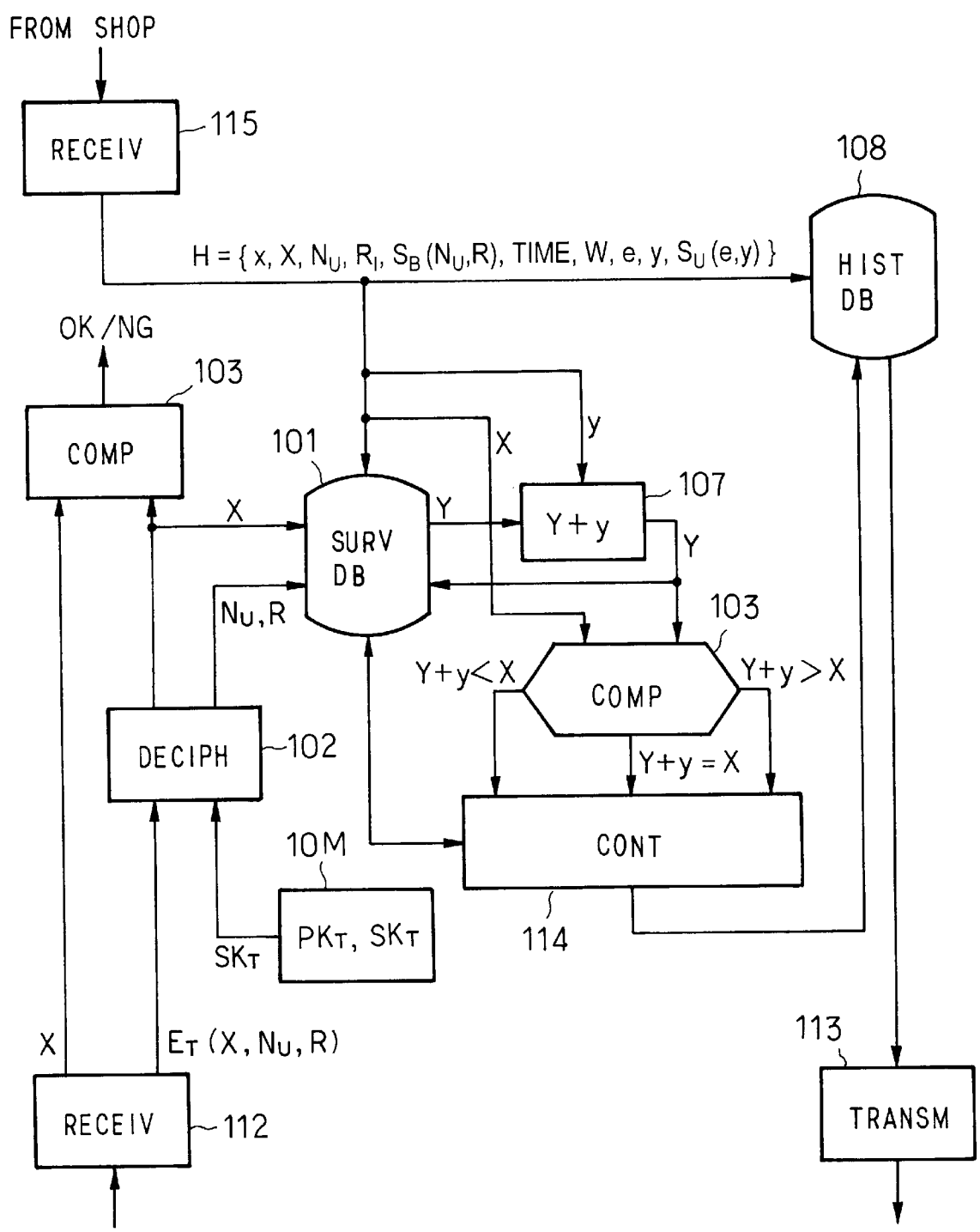
FIG. 11 is a block diagram illustrating the functional configuration of a surveillance institution apparatus in the second embodiment of the present invention.

The surveillance institution 100 comprises, as depicted in FIG. 11, the memory 10M, the surveillance database 101, the decipher part 102, the comparison part 103, the history database 108, the add part 107, the receiving part 112, the transmitting part 113, the receiving part 115 and the control part 114 for controlling the operations of the respective parts. When the data X and $E_T(X,N_U,R)$ from the bank 200 is received in the receiving part 112, the decipher part 102 deciphers it by using the deciphering secret key $SK_T$ to obtain $(X,N_U,R)$. A check is made in the comparison part 103 to see if the thus obtained amount of money X matches the received one X. If they match, the pair of the key $N_U$ and the data $(X,N_U,R)$ and the initial value Y=0 of the corresponding total amount of money used are registered in the surveillance database 101.

Thereafter, when the communication history data H={x, $X,N_U,R,S_B(N_U,R)$,TIME,W,e,y,$S_U(e,y)$} for the procedure of payment with the electronic cash C={x,X,$N_U$,R,$S_B(N_U$,R)} is received from the shop 400 in the receiving part 115, the control part 114 retrieves the surveillance database 101 to see if$(X,N_U,R)$ in the received data has already been registered as management data, and if not, the control part 114 decides that the payment with the electronic cash is improper and sends the data $(X,N_U,R)$ to the bank that issued the electronic cash. If the data $(X,N_U,R)$ has already been registered, the total amount of payments Y in the surveillance database 101, corresponding to the management data $(X,N_U,R)$, and the amount of payment y in the communication data H are added together in the adding part 107.

The result of this addition is compared in the comparison part 103 with the face value X in the data H. If the result of this comparison is Y+y>X, the control part 114 decides that the payment with the electronic cash is improper and erases the management data $(X,N_U,R)$ and the corresponding total amount of payments Y from the surveillance database 101 and, at the same time, sends the data $(X,N_U,R)$ to the bank that issued the electronic cash. If Y+y<X, the control part 114 decides that the use of the electronic cash is proper, then records the data H in the history database 108, and updates the corresponding total amount of payments Y in the surveillance database 101 with the result of addition in the adding part 107. When Y+y=X, it means that all the face value X of the electronic cash is spent, and consequently, the management data $(X,N_U,R)$ and the corresponding total amount of payments Y are erased from the surveillance database 101.

In the above second embodiment, instead of sending $E_T(X,N_U,R)$ to the bank and the surveillance institution, the user may first encipher $(X,N_U,R)$ by a hash function to obtain n=h$(X,N_U,R)$, then encipher the information n to obtain $E_T(n)$, which in turn is sent to the bank and further to the surveillance institution. In this case, the bank records the information $E_T(n)$ as management data in the user database, and the surveillance institution registers the $E_T(n)$ or n as management data in the surveillance database. This modification may further be modified such that instead of obtaining n=h$(X,N_U,R)$, the data $(X,N_U)$ may be compressed as n=h$(X,N_U)$ and information (n,R) may be enciphered to obtain $E_T(n,R)$, then $E_T(n,R)$ may be sent to the bank and the surveillance institution. In a further alternative, $(N_U,R)$ may be hashed or only $N_U$ may be hashed to obtain n=h$(N_U,R)$ or n=h$(N_U)$, then $E_T(X,n)$ or $E_T(X,n,R)$, respectively may be sent to the bank and the surveillance institution.

In the second embodiment, if the same user's signature verification key $N_U$ is changed every time the user requests issuance of electronic cash, the variable number (e.g., random number) R may not be used. In the case of not using the random number R, the bank 200 records data $(X,N_U)$ in correspondence with the user's name U in the user database 201, and the surveillance institution 100 registers either $(X,N_U)$ or $E_T(X,N_U)$.

Alternatively, a random number R may be used as in $(X,N_U,R)$ only for the purpose of higher security in communication from the user via the bank 200 to the surveillance institution 100. In the latter case, the random number R is not included in the electronic cash to be sent to a shop; therefore, in the issuance of electronic cash, the surveillance institution has to register both $(X,N_U)$ and $E_T(X,N_U,R)$ in the surveillance database 101 in correspondence with each other so that in the tracing of overspender, $E_T(X,N_U,R)$ can be extracted from the surveillance database 101 using the $(X,N_U)$ from the shop as a keyword.

Furthermore, in the latter case, the surveillance institution may register a pair of $(X,N_U)$ and R as management data instead of a pair of $(X,N_U)$ and $E_T(X,N_U,R)$, and when having found an overspender, the surveillance institution can produce $E_T(X,N_U,R)$ using the detected $(X,N_U)$ and corresponding R.

EFFECT OF THE INVENTION

The first embodiment of the present invention has a defect that user privacy is not provided if the bank and the shop conspire, but has advantages that user privacy is preserved unless the bank does wrong and that overspending of electronic cash can be detected.

The second embodiment is, as is the case with the Chaum et al. system, advantageous in that user privacy can be provided even if the bank conspires with the shop and that overspending of electronic cash can be detected.

With either of the methods according to the present invention, the amount of communication in the payment processing can be made smaller than in the Chaum et al. system. Besides, the electronic cash is divisible and the electronic cash issuer and the financial institution (i.e., bank) that manages users' accounts can be separated hierarchically.

For example, according to the Chaum et al. scheme, when the probability of success in overspending in the payment with electronic cash is $\frac{1}{2}^{30}$, processing needs to be performed 30 times, so that if the output size of the one-way function is assumed to be 128 bits, an amount of communication of at least (3×128×30)=11520 bits is required.

According to the present invention, the sizes of the data y and e and the user signature $S_U(e,y)$ therefor become the amount of communication in the payment processing. The total of the sizes of the data y and e (and TIME,W) is a maximum of about 20 bits. Assuming that the size of the signature is 1023-bit, the total is 1200-bit at the maximum.

Thus, according to the present invention, the amount of communication that is needed for the payment processing can be reduced by approximately 1/10 that in the past.

Moreover, the electronic cash issued can be divided and used repeatedly until the total sum of payments reaches the face value.

Besides, financial institutions (banks) that issue electronic cash and an institution (the surveillance institution) that performs verification processing for settlement of accounts can be separated so that the amount of circulation of electronic cash issued by the former is kept under the surveillance of the latter. That is, the surveillance institution is capable of detecting the total sum of electronic cash issued by the banks and the total sum of electronic cash returned to them, and hence it can monitor the amount of electronic cash circulating at each point in time.

What is claimed is:

1. An electronic cash implementing method for an electronic cash system which comprises a surveillance institution for keeping the issuance of electronic cash under surveillance, a bank which issues electronic cash, a user who uses electronic cash, and a shop which receives a payment with electronic cash, said method comprising:

step (1) wherein said user sends user information U and an amount of money X corresponding to a face value of electronic cash to said bank and requests the bank to withdraw said amount X from a bank account of said user;

step (2) wherein said bank withdraws said amount X from said bank account of said user, generates a signature $S_B$ of said bank for information n including information of a user signature verification key $N_U$ and information of said amount X, sends the signature $S_B$ to said user, records said information n as management data n in a user database in correspondence with said user information U, and sends said management data n to said surveillance institution;

step (3) wherein said surveillance institution registers said management data n in a surveillance database in correspondence with a total amount of payments Y;

step (4) wherein said user pays an amount of money y to said shop, using information including a balance x, said amount X, said signature verification key $N_U$ and said signature $S_B$ as electronic cash C of said face value X and said shop receives said electronic cash C after verifying its validity;

step (5) wherein said shop sends to said surveillance institution, for the settlement of an account, whole data H of communication between said shop and said user, including information on said electronic cash C; and step (6) wherein said surveillance institution verifies validity of said electronic cash C contained in said communication data H and instructs said bank to transfer said amount of payment y to a bank account of said shop.

2. The method of claim 1, wherein in said step (4) said user sends to the shop a balance of the electronic cash included in information of the electronic cash.

3. The method of claim 2, wherein said step (4) comprises:

step (4a) wherein said shop generates arbitrary challenge information e and sends said arbitrary challenge information e to said user;

step (4b) wherein said user generates his signature $S_U(e,y)$ for said amount of payment y and said challenge information e sent to him and sends said amount of payment y and said signature $S_U(e,y)$ of said user to said shop; and step (4c) wherein said shop verifies the validity of said signature $S_B$ of said bank, verifies the validity of said signature $S_U(e,y)$ of said user by said verification key $N_U$, and verifies that said amount of payment y is smaller than said balance x of said electronic cash, and if the results of any of said verifications are valid, said shop approves of the payment of said amount y with said electronic cash.

4. The method of claim 2 or 3, wherein said step (6) comprises:

step (6a) wherein said surveillance institution makes a check to see if said management data n obtainable from said communication data H has been registered in said surveillance database;

step (6b) wherein if said communication data H has been registered, said surveillance institution updates said total amount of payments Y corresponding to said management data n with Y+y;

step (6c) wherein said surveillance institution makes a check to see if said updated total amount of payments Y+y is smaller than said face value X, and if so, instructs said bank to transfer the amount of money y to a bank account of said shop;

step (6d) wherein if Y+y=X, said surveillance institution erases from said surveillance database said management data n and said total amount of payments Y corresponding thereto; and step (6e) wherein when the result of any one of said checks is invalid, said surveillance institution decides that said user committed overspending, then erases from said surveillance database said management data n and said corresponding total amount of payments Y, and sends said management data n to said bank to specify the name of an overspending user from said user database.

5. The method of claim 4, wherein said management data n comprises a pair of said face value X and said signature verification key $N_U$.

6. The method of claim 1, 2 or 3, wherein said step (1) includes a step wherein said user produces said signature verification key $N_U$.

7. The method of claim 1, 2 or 3, wherein said step (1) includes a step wherein said user generates a variable number R and sends said variable number R together with said signature verification key $N_U$ to said bank and further to said surveillance institution and said step (2) includes a step wherein said bank records, as said management data n, information including said signature verification key $N_U$ and said variable number R, and said step (3) includes a step wherein said surveillance institution registers, as said management data n, information including said signature verification key $N_U$ and variable number R.

8. The method of claim 1, 2 or 3, further includes a step wherein said surveillance institution produces said signature verification key $N_U$ and sends said signature verification key $N_U$ to said user.

9. The method of claim 1, 2 or 3, wherein said management data n includes information obtained by processing data including said signature verification key $N_U$ with a predetermined one-way hash function h.

10. An electronic cash implementing method for an electronic cash system which is composed of a surveillance institution which keeps the issuance of electronic cash under surveillance, a bank which issues electronic cash, a user who uses electronic cash, and a shop which receives a payment with electronic cash, and wherein said surveillance institution makes public an encipher function $E_T$ and said bank makes public a bank signature verification key $PK_B$, said method comprising:

step (1) wherein said user sends user information U and an amount of money X corresponding to the face value of electronic cash to said bank and requests the bank to withdraw said amount of money X from a bank account of said user, while at the same time said user enciphers information n including signature verification key $N_U$ to produce enciphered information $E_T(n)$ and sends said enciphered information $E_T(n)$ to said bank;

step (2) wherein said bank withdraws said amount of money X from said bank account of said user and sends said amount of money X and said enciphered information $E_T(n)$ to said surveillance institution, while at the same time said bank records said enciphered information $E_T(n)$ as management data in a user database in correspondence with said user information U;

step (3) wherein said surveillance institution deciphers said enciphered information $E_T(n)$ to obtain said information n and registers at least one of said information n and said enciphered information $E_T(n)$ as management data in a surveillance database in correspondence with a total amount of payments Y;

step (4) wherein said user requests said bank to attach a blind signature to said information n to obtain a bank signature $S_B$ of said bank for said amount of money X;

step (5) wherein said user pays an amount of money y to said shop, using, as electronic cash C of said face value X, second information including said bank signature $S_B$, a balance x, said face value X and said user signature verification key $N_U$ and said shop receives said electronic cash C after verifying its validity;

step (6) wherein said shop sends to said surveillance institution, for the settlement of an account, whole data H of communication between said shop and said user, including information on said electronic cash C; and step (7) wherein said surveillance institution verifies the validity of said electronic cash C contained in said communication data H and instructs said bank to transfer said amount of payment y to a bank account of said shop.

11. The method of claim 10, wherein said step (5) comprises:

step (5a) wherein said shop generates arbitrary challenge information e and sends it to said user;

step (5b) wherein said user generates a user signature $S_U(e,y)$ for said amount of payment y and said challenge information e sent to him and sends said electronic cash C=$\{x,X,N_U,S_B\}$ and information $\{y,S_U(e,y)\}$ to said shop; and step (5c) wherein said shop verifies the validity of said bank signature $S_B$ by said bank signature verification key $PK_B$ and the validity of said user signature $S_U(e,y)$ by said user signature verification key $N_U$, and if both of said signatures are valid, said shop approves of the payment of said amount y with said electronic cash.

12. The method of claim 10 or 11, wherein said step (7) comprises:

step (7a) wherein said surveillance institution makes a check to see if said at least one of said information n and said enciphered information $E_T(n)$ obtainable from said communication data H has been registered as said management data in said surveillance database;

step (7b) wherein if said management data has been registered, said surveillance institution updates said total amount of payments Y corresponding to said at least one of said signature verification key information and said enciphered information $E_T(n)$ with Y+y;

step (7c) wherein said surveillance institution makes a check to see if said updated total amount of payments Y+y is smaller than said face value X, and if so, instructs said bank to transfer the amount of money y to a bank account of said shop;

step (7d) wherein if Y+y=X, said surveillance institution erases from said surveillance database said management data and said total amount of payments Y corresponding to said at least one of said information n and said enciphered information $E_T(n)$; and step (7e) wherein when the result of any one of said checks is invalid, said surveillance institution decides that said user committed overspending, then erases from said surveillance database said management data corresponding to said at least one of said signature verification information and said enciphered information $E_T(n)$ and said corresponding total amount of payments Y, and sends said at least one of said information n and said enciphered information $E_T(n)$ to said bank to specify the name of an overspending user from said user database.

13. The method of claim 12, wherein said management data is composed of a pair of said face value X and said signature verification key $N_U$.

14. The method of claim 10 or 11, wherein said step (1) includes a step wherein said user produces said signature verification key $N_U$.

15. The method of claim 10 or 11, wherein said step (1) includes a step wherein said user generates a variable number R and incorporates said variable number R in said information n to be enciphered, said enciphered information $E_T(n)$ being transferred to said bank and further to said surveillance institution and said step (2) includes a step wherein said bank records, as said management data, said information n including said signature verification key $N_U$ and said variable number R, and said step (3) includes a step wherein said surveillance institution registers, as said management data, said information n including said signature verification key $N_U$ and variable number R.

16. The method of claim 10 or 11, which further includes a step wherein said surveillance institution produces said signature verification key $N_U$ and sends it to said user.

17. The method of claim 10 or 11, wherein said management data includes information obtained by processing data including said signature verification key $N_U$ with a predetermined hash function h.

18. A user apparatus for implementing an electronic cash system which is composed of a surveillance institution which keeps the issuance of electronic cash under surveillance, a bank which issues electronic cash, a user who uses electronic cash and a shop which receives a payment with electronic cash, said apparatus comprising:

key generating means for generating a user signature key $SK_U$;

memory means for storing electronic cash C containing a bank signature $S_B$ on information n, a balance x, an amount of money X and a signature verification key, $N_U$, and said user signature key $SK_U$, said information n including the amount of money X corresponding to a face value and said signature verification key $N_U$;

signature generating means for attaching a signature to an amount of payment y and arbitrary challenge information e received from said shop by said user signature key $SK_U$ to generate a signature $S_U(e,y)$; and balance updating means for subtracting said amount of payment y from said balance x to update the latter.

19. A surveillance institution apparatus for implementing an electronic cash system which is composed of a surveillance institution which keeps the issuance of electronic cash under surveillance, a bank which issues electronic cash, a user who uses electronic cash and a shop which receives a payment with electronic cash, said apparatus comprising:

a surveillance database wherein information n corresponding to each user possessing electronic cash issued thereto is registered as management data in correspondence with a total amount of payments Y, said information n including a user's signature verification key $N_U$;

a history database for storing communication history data H which contains electronic cash C including a balance x, a face value amount of money X, a signature verification key $N_U$ and a bank signature $S_B$ on said information n, and an amount of payment y all received from said shop;

means for making a check to see if there has been registered in the surveillance database said management data n corresponding to said face value amount of money X and said signature verification key $N_U$ in said communication history data H and, if not, for deciding that the electronic cash paid to the shop is overspent electronic cash;

adding means for adding said amount of payment y in said history data to said total amount of payments Y in the surveillance database when said management data n has been registered therein;

compare means for comparing the result of addition Y+y with said face value amount of money X; and control means which: if the result of said comparison by said compare means is Y+y<X, updates said total amount of payments Y in the surveillance database with the result of said addition Y+y; if Y+y=X, eliminates said management data n and said total amount of payments Y from said surveillance database; if Y+y>X, decides that electronic cash paid to said shop is overspent electronic cash, then eliminates said management data n and said amount of payments Y, and reports said eliminated management data n to said bank.

20. A user apparatus for implementing an electronic cash system which is composed of a surveillance institution which keeps the issuance of electronic cash under surveillance, a bank which issues electronic cash, a user who uses electronic cash and a shop which receives a payment with electronic cash, said apparatus comprising:

key generating means for generating a user signature key $SK_U$;

encipher means for enciphering information n including a signature verification key $N_U$ by a public encipher key $PK_T$ of said surveillance institution to generate enciphered information $E_T(n)$ and for sending said enciphered information $E_T(n)$ to said bank;

blind signature pre-processing means for pre-processing information n including said signature verification key $N_U$ to produce pre-processed signature verification key information F(n), said pre-processed signature verification key information F(n) being sent to said bank;

blind signature post-processing means for post-processing a blind signature Z(n) for said signature verification key information F(n) received from said bank to obtain a signature $S_B$ of said bank;

memory means for storing electronic cash C, said user signature key $SK_U$ and said public encipher key $PK_T$ of said surveillance institution, said electronic cash C containing a balance, on amount of money X, said signature verification key $N_U$ and said bank signature $S_B$;

signature generating means for attaching a signature to an amount of payment y and arbitrary challenge information e received from said shop by said user signature key $SK_U$ to generate a signature $S_U(e,y)$; and balance updating means for subtracting said amount of payment y from said balance x to update the latter.

21. A surveillance institution apparatus for implementing an electronic cash system which is composed of a surveillance institution which keeps the issuance of electronic cash under surveillance, a bank which issues electronic cash, a user who uses electronic cash and a shop which receives a payment with electronic cash, and wherein said surveillance institution makes public an encipher function $E_T$ and said bank makes public a signature verification key $PK_B$, said apparatus comprising:

a memory for storing a secret decipher key $SK_T$ for deciphering said public encipher function $E_T$;

decipher means for deciphering, by using said secret decipher key $SK_T$, enciphered information $E_T(n)$ for information n containing a signature verification key $N_U$ to obtain said information n as management data;

a surveillance database for registering therein said deciphered management data n and the total amount of payments Y corresponding thereto;

a history database for storing history data H which contains electronic cash C including a balance x, an amount of money X, a signature verification key $N_U$ and a bank signature $S_B$ on information n including said signature verification key $N_U$, and an amount of payment y all received from said shop;

means for making a check to see if there has been registered in said surveillance database said management data n corresponding to said amount of money X and said signature verification key $N_U$ in said history data H and, if not, for deciding that the electronic cash paid to said shop is overspent electronic cash;

adding means for adding said amount of payment y in said history data to said total amount of payments Y in said surveillance database when said management data n has been registered therein;

compare means for comparing the result of said addition Y+y with said amount of money X; and control means which: if the result of said comparison by said compare means is Y+y<X, updates said total amount of payments Y in said surveillance database with the result of addition Y+y; if Y+y=X, eliminates said management data n and said total amount of payments Y from said surveillance database; if Y+y>X, decides that said electronic cash paid to said shop is overspent electronic cash, then eliminates said management data n and said total amount of payments Y, and reports said eliminated management data n to said bank.

* * * * *